US007660414B2

(12) United States Patent
Suzuki

(10) Patent No.: US 7,660,414 B2
(45) Date of Patent: Feb. 9, 2010

(54) ENCRYPTION/DECRYPTION METHOD AND AUTHENTICATION METHOD USING MULTIPLE-AFFINE KEY SYSTEM

(75) Inventor: Shuichi Suzuki, Tokyo (JP)

(73) Assignee: Fujisoft ABC Inc., Kamakura-shi (JP)

( * ) Notice: Subject to any disclaimer, the term of this patent is extended or adjusted under 35 U.S.C. 154(b) by 840 days.

(21) Appl. No.: 11/100,409

(22) Filed: Apr. 7, 2005

(65) Prior Publication Data

US 2005/0265546 A1    Dec. 1, 2005

Related U.S. Application Data

(63) Continuation of application No. 09/453,696, filed on Dec. 3, 1999, now abandoned.

(30) Foreign Application Priority Data

Apr. 28, 1999 (JP) ................................. 11-122866
Jul. 30, 1999 (JP) ................................. 11-216997

(51) Int. Cl.
*H04L 9/00* (2006.01)
(52) U.S. Cl. ........................ 380/44; 380/277; 380/46; 708/250; 708/255
(58) Field of Classification Search ........................ None
See application file for complete search history.

(56) References Cited

U.S. PATENT DOCUMENTS

| 4,418,275 | A | 11/1983 | Oosterbaan et al. |
| 5,444,781 | A | 8/1995 | Lynn et al. |
| 6,058,476 | A | 5/2000 | Matsuzaki et al. |
| 6,081,598 | A | 6/2000 | Dai |
| 6,351,813 | B1 * | 2/2002 | Mooney et al. ............. 713/185 |
| 6,550,011 | B1 | 4/2003 | Sims, III |

FOREIGN PATENT DOCUMENTS

WO    WO 85/00259    *    1/1985

OTHER PUBLICATIONS http://sciencelinks.jp/j-east/article/199921/000019992199A0793739.php, 1 page, printed: Jul. 27, 2009.*
Roggeman, Yves, "Varying Feedback Shift Registers," in *Advances in Cryptology—Eurocrypt '89*, Workshop on the Theory and Application of Cryptographic Techniques Proceedings, Hourthalem, Belgium, Apr. 10, 1989, pp. 670-679.
Boyar, Journal of the Association for Computing Machinery, vol. 36, No. 1, Jan. 1989, pp. 129-141.
Journal of Sichuan University (Natural Science Edition), vol. 34, No. 5 (Oct. 1997).

* cited by examiner (Continued)

*Primary Examiner*—Ponnoreay Pich
(74) *Attorney, Agent, or Firm*—Oblon, Spivak, McClelland, Maier & Neustadt, L.L.P.

(57) ABSTRACT

In the encryption/decryption method, a random number sequence $\{r_i\}$ is generated on the basis of a given multiple-affine key system K and encryption is performed by an exclusive OR of the random number sequence $\{r_i\}$ with a plain text. Further, the multiple-affine key system K is automatically sequentially rewritten into a series of new multiple-affine key systems each time when the number of use times of the multiple-affine key system reaches a predetermined number and encryption of plain texts thereafter is continued while generating random numbers using the series of the rewritten multiple-affine key systems. Likewise, in decryption as well, since decryption is performed using a multiple-affine key system automatically rewritten each time when the number of use times reaches a predetermined number, a third party cannot reproduce the multiple-affine key system and therefore cannot decipher a cipher text.

6 Claims, 16 Drawing Sheets

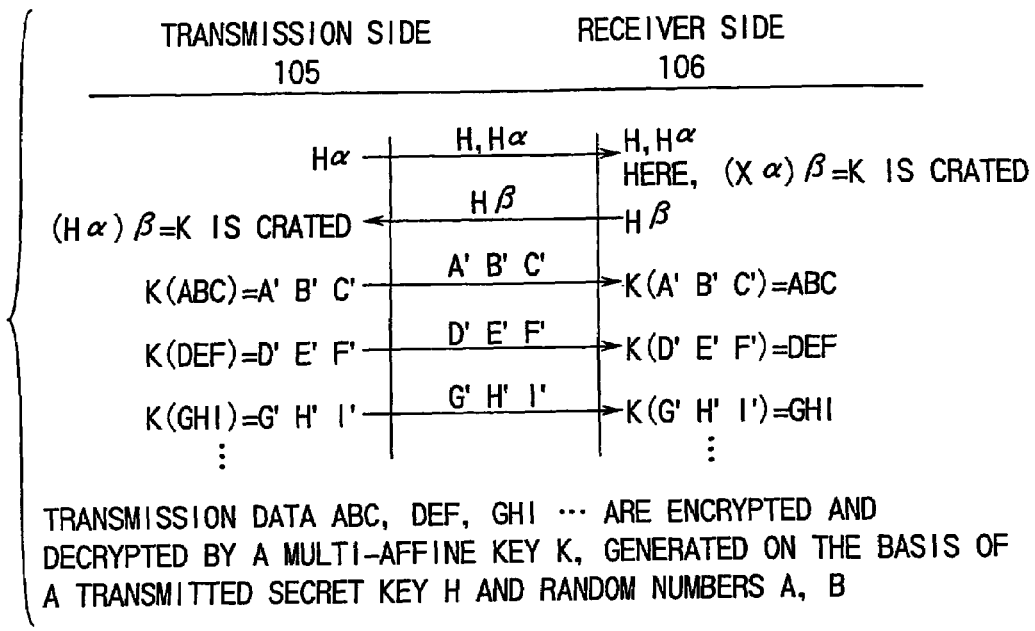

FIG. 4

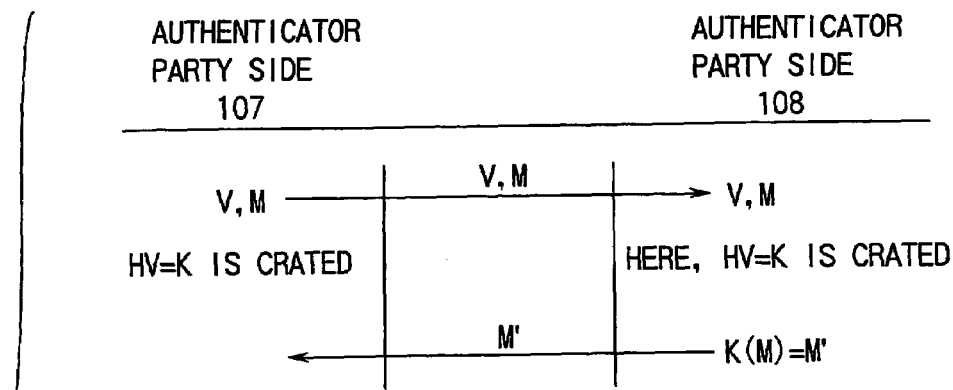

IF K(M)=M', AUTHENTICATED
IF K(M)≠M', NOT AUTHENTICATED
AN AUTHENTICATOR PARTY PERFORMS AUTHENTICATION OF AN
AUTHENTICATED PARTY BY EFFECTING COLLATION ON A DECRYPTED
VALUE M' OF COMMUNICATION TEXT M BY A MULTI-AFFINE KEY K
GENERATED FROM A UNIQUE SECRETE KEY H AND AN INITIAL VECTOR
V WHICH ARE GIVEN TO THE AUTHENTICATED PARTY.
WHEN A COMMUNICATION TEXT M IS FIXED, TRANSMISSION OF
A COMMUNICATION TEXT TO THE AUTHENTICATED PARTY FROM
THE AUTHENTICATOR PARTY CAN BE OMITTED

FIG. 5

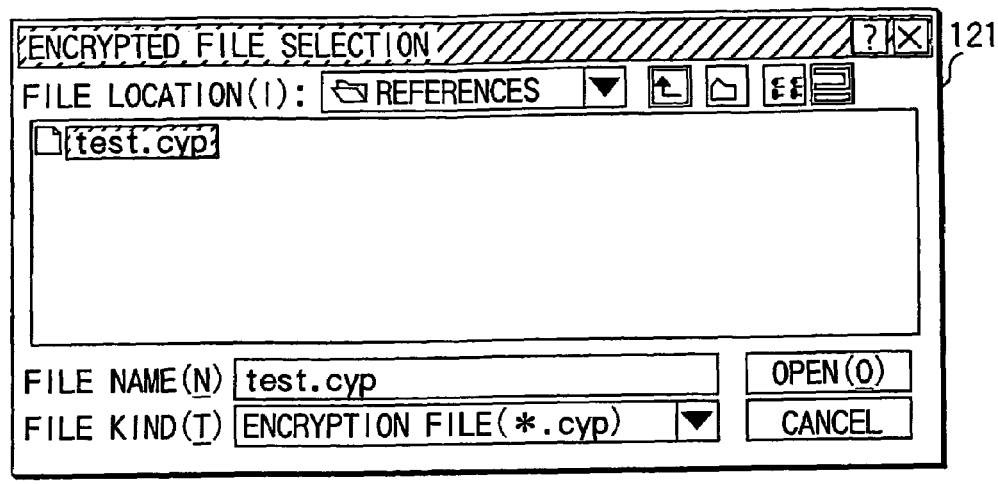
FIG. 17
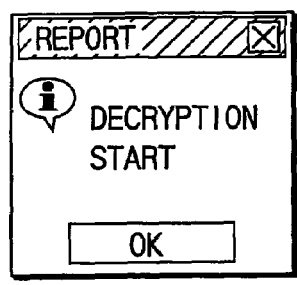 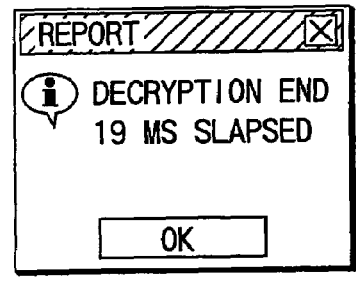
FIG. 18A    FIG. 18B
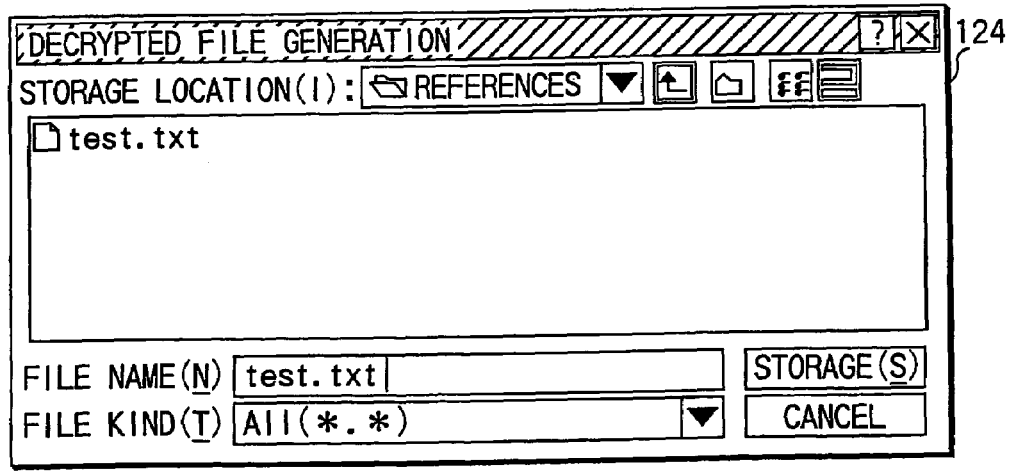
FIG. 19

ENCRYPTION/DECRYPTION METHOD AND AUTHENTICATION METHOD USING MULTIPLE-AFFINE KEY SYSTEM

CROSS-REFERENCE TO RELATED APPLICATIONS

This application is a continuation application of, and claims priority to, Ser. No. 09/453,696 filed Dec. 3, 1999 and claims priority to JP 11-122866 filed Apr. 28, 1999 and JP 11-216997 filed Jul. 30, 1999, the contents of which are being incorporated by reference.

BACKGROUND OF THE INVENTION

The present invention relates to an encryption method, an encryption communication method and an encryption communication system, which all employ a stream cipher that cannot be deciphered with ease.

A stream encryption method has hitherto been known, which can process data easily and fast.

A steam encryption method is to generate a random number sequence $\{r_i\}$ for a bit string $\{m_i\}$ and then to generate a cipher text $\{C_i\}$ by an operation $C_i=m_i$ (xor) $\{r_i\}$, where (xor) means an exclusive OR.

A conventional stream encryption method, however, cannot achieve a sufficient protection against a known plain text attack. There have been contrived various methods to avoid the known plain text attack. However, these methods cannot completely protect a stream cipher against the known plain text attack.

Besides, security cannot be guaranteed and an encryption key can be specified with ease by the known plain text attack, though a stream cipher can be generated using pseudo-random numbers.

For example, the Lehmer method, being one of random number generation methods, is to define a random number for integers (a, b and m) with $$r_i=(ar_{i-1}+b)(\bmod m),$$

where an initial value is set to $r_0$, thereby allowing generation of a stream cipher. In this case, the integers a, b and m are encryption keys.

However, a random number sequence $\{r_i\}$ can easily be specified by the known plain text attack and it is easy to determine the integers a, b and m using this sequence.

Thus, even with a specific algorithm for pseudo-random number generation, an encryption key can be found by specifying undetermined factors or the like if there are a sufficient volume of encrypted data. Further, a secure cipher can not be formulated with only one time multiplication by an integer.

In view of the drawbacks in the stream cipher, a so-called chaos cipher has been made its debut for several years. The chaos cipher is a cryptosystem characterized by high security, and a random number sequence $\{x_i\}$ therefore is generated by the following second degree polynomial, wherein an initial value of a real number $x_0$, real numbers a, b and c are employed:

$$x_i=ax^2_{i-1}+bx_{i-1}+c.$$

As well known, a number sequence $\{x_i\}$ shows a very complex chaos. In this case, the a, b and c are considered to be encryption keys.

A plurality of such random number sequences $\{y_i\}$, $\{z_i\}$, ... are prepared and encryption for a character sequence $\{m_i\}$ is defined by the following equation:

$$C_i=(x_i)(xor)(y_i)(xor)(z_i)(xor)\ldots(xor)m_i,$$

where $(x_i)$ indicates a integer part of $x_i$.

In this method, a random number sequence in real number is partly masked and only partial information is utilized for encryption so that an encryption key is difficult to be specified. According to this encryption method, an advantage is obtained since high-speed encryption has been realized by only software without use of a specifically prepared chip as under DES.

However, there has still been a drawback that, even when a chaos cipher is employed, encryption can not be completed unless two or more times of multiplication by a real number is operated and therefore, a long time is required for operation of encryption processing. Also, since operation in real number is different in way of mounting according to a compiler or a model of a processor, a chaos cipher essentially has a processor-model dependency, which results in lack in versatility in application.

Accordingly, there has been desired that an encryption technique that enables high-speed encryption and provides a cipher which can not be deciphered. Further, an encryption technique with versatile applications has been on demand.

BRIEF SUMMARY OF THE INVENTION

The present invention has been achieved in order to solve the above problem and it is an object of the present invention to provide an encryption method and an encryption system with versatile applications, which enable high-speed encryption, and whereby a cipher that cannot be deciphered can be generated.

The present invention in a first embodiment is directed to an encryption method comprising: a random number generation step of generating a random number sequence $\{r_i\}$ on the basis of a multiple-affine key system; a rewriting step of rewriting the multiple-affine key system each time when the number of use times of the multiple-affine key system reaches a predetermined number in the random number generation step and again using a series of the rewritten multiple-affine key systems in the random number generation step; and an encryption step of generating a cipher text $\{C_i\}$ by operating an exclusive OR of the random number sequence generated in the random number generation step with a plain text to be encrypted.

In the first embodiment, which has the above described feature, random numbers are generated for encryption using a multiple-affine key system whose contents are automatically rewritten each time when the number of use times of the multiple-affine key system reaches a predetermined number. If a third party who tries to illegally decrypt a cipher text temporarily succeeds in deciphering a key for generation of random numbers, the key is rewritten and eventually, the third party cannot decrypt the cipher text. Therefore, high security encryption/decryption can be realized by this method.

Further, the present invention in the first embodiment is directed to an encryption method, wherein the rewriting step is a step of rewriting coefficients a and b of the multiple-affine key system each time when the number c of use times of the multiple-affine key system reaches an upper limit number n according to a procedure of $K[i].a=K[j].a\times K[i].a+K[j].b$ and $K[i].b=K[j].a\times K[i].b+K[j].b$, where a and b are integers, c is use times of the multiple-affine key system, n is the upper limit (lifetime) number of use times of the multiple-affine key system, the multiple-affine key system is expressed with 4 integers: K={a, b, c, n}, an operation of the key is expressed K(x)=ax+b, the multiple-affine key system is constituted of a plurality of affine keys and i and j are integers.

The first embodiment is to specify a particular feature of the multiple-affine key system of the present invention. In the embodiment, a multiple-affine key system constituted of a plurality of affine keys defined with 4 integers including two integers a and b, the number c of use times and a key life time n. Thereby, particular forms of a multiple-affine key system are apparent.

Further, the present invention in a second embodiment is directed to an encryption method, wherein the random number generation step includes: multiple-affine key system generation means for generating the multiple-affine key system on the basis of given secret key data and initial random number sequence data; and random number generation step of generating a random number sequence $\{r_i\}$ on the basis of the multiple-affine key system generated by the multiple-affine key system generation means.

The second embodiment is to show a case where the multiple-affine key system is simply not given in the encryption method but generated from the secret key data and the initial random number sequence, thereby providing an encryption method with higher security is provided.

Further, the present invention in the first embodiment is directed to an encryption/decryption method which comprises: a first random number generation step of generating a random number sequence $\{r_i\}$ on the basis of a multiple-affine key system; a first rewriting step of rewriting the multiple-affine key system each time when the number of use times of the multiple-affine key system reaches a predetermined number in the first random number generation step and again using a series of rewritten multiple-affine key systems in the first random number generation step; an encryption step for generating a cipher text $\{C_i\}$ from an exclusive OR operation of the random number sequence generated in the first random number generation step with a plain text to be encrypted; a second random number generation step of generating the random number sequence $\{r_i\}$ on the basis of the multiple-affine key system; a second rewriting step of rewriting the multiple-affine key system each time when the number of use times of the multiple-affine key system reaches a predetermined number in the second random number generation step and again using a series of rewritten multiple-affine key system in the second random number generation step; and a decryption step of decrypting the cipher text to the plain text by operating an exclusive OR of the random number sequence generated in the second random number generation step with the cipher text $\{C_i\}$ encrypted in the encryption step.

The first embodiment, as described above, is to specify not only an encryption step but also a decryption step for decrypting a cipher text to a plain text by random numbers generated from a multiple-affine key system likewise. Herein, the same random numbers are generated by a multiple-affine key system in a procedure similar to an encryption step and the same rewriting is performed between encryption and decryption steps. Further, it is shown that encryption and decryption are performed by an exclusive OR.

The present invention in a fourth embodiment is directed to a communication apparatus which comprises: random number generation means for generating a random number sequence $\{r_i\}$ on the basis of a multiple-affine key system in storage; rewriting means for rewriting the multiple-affine key system each time when the number of use times of the multiple-affine key system reaches a predetermined number in the random number generation means and again using a series of rewritten multiple-affine key systems in the random number generation means; encryption means for generating a cipher text $\{C_i\}$ by operating an exclusive OR of the random number sequence generated in the random number generation means with a plain text to be encrypted; and transmission means for transmitting the cipher text encrypted by the encryption means to another communication apparatus through a network.

The fourth embodiment, as described above, shows a case where encryption/decryption using a multiple-affine key system of the present invention is applied to a communication apparatus through a network and a communication system with high security can be established by an automatic rewrite function of a multiple-affine key system.

Further, the present invention in a fifth embodiment is directed to a communication apparatus, wherein the random number generation means further includes multiple-affine key system generation means for generating a series of multiple-affine key systems on the basis of given initial random number sequence data.

The fifth embodiment provides a communication apparatus with high security in which a multiple-affine key system is not given at start of processing but is generated by given initial random number sequence data.

Further, the present invention in a seventh embodiment is directed to an authentication method which comprises: a transmission step of transmitting an initial random number sequence and a communication text from an authenticator party to an authenticated party; a random number generation step of generating a random number sequence using a multiple-affine key system given in advance on the basis of the initial random number sequence transmitted by the transmission step on the authenticated party; an encryption step of encrypting the communication text to obtain an encrypted communication text on the basis of the random number sequence generated by the random number generation step on the authenticated party and transmitting the encrypted communication text to the authenticator party; and an authentication step of, on the authenticator party, generating the random number sequence on the basis of the initial random number sequence using the multiple-affine key system given in advance, decrypting the encrypted communication text generated by the encryption step on the basis of the random number sequence to obtain a decrypted communication text and performing authentication of the authenticated party by the authenticator party according to whether or not the decrypted communication text is equivalent to the communication text transmitted in the transmission step.

The seventh embodiment is to apply a multiple-affine key system of the present invention to an authentication method of, for example, a credit card and there is provided an authentication method, by which authentication of an individual person or the like is enabled over communication with high security.

The present invention in a ninth embodiment is directed to a computer program, which is recorded in a executable form in a medium that is readable by a computer having a processor, and which, in execution, is loaded on computer memory to operate the computer, comprises: first instruction means for issuing an instruction to the processor of the computer to generate a random number sequence $\{r_i\}$ on the basis of a given multiple-affine key system; second instruction means for issuing an instruction to the processor of the computer to rewrite the multiple-affine key system each time when the number of use times of the multiple-affine key system reaches a predetermined number by an instruction to the first instruction means and further issuing an instruction to the processor of the computer to again use a series of rewritten multiple-affine key systems by an instruction of the first instruction means; and third instruction means for issuing an instruction to the processor of the computer to generate a cipher text $\{C_i\}$ by operating an exclusive OR of the random number sequence generated by an instruction of the first instruction means with a plain text to be encrypted.

The ninth embodiment is a computer program operated on a computer, which is applied with a multiple-affine key system of the present invention. The application program detailed in the figure enables encryption/decryption of any digital data as an object and realizes high security.

Further, the present invention in a tenth embodiment is directed to a medium recording/reproduction device which comprises: rotation means for rotating a record medium at a prescribed speed in reading and writing while holding; input means for externally inputting prescribed information; random number generation means for generating a random number sequence $\{r_i\}$ on the basis of a series of multiple-affine key systems rewritten each time when the number of generation times of random numbers reaches a predetermined number; encryption means for encrypting the prescribed information from the input means on the basis of the random number sequence from the random number generation means and outputting encrypted information; recording means for recording the encrypted information from the encryption means on the record medium; reading means for reading the encrypted information recorded on the record medium; decryption means for decrypting the encrypted information read by the reading means on the basis of the random number sequence from the random number generation means and outputting decrypted information; and outputting means for outputting the decrypted information output by the decryption means to the outside.

The tenth embodiment is to apply a multiple-affine key system of the present invention in a medium recording/reproduction device that performs recording to/reproduction from a record medium as an object on which digital data is stored and the multiple-affine key system of the present invention is applicable to any record medium that accepts digital data, such as a floppy disk driver and MO and high security is attained.

The present invention in an eleventh embodiment is directed to an optical disk recording/reproduction device which comprises: rotation means for rotating an optical disk medium at a prescribed speed in reading and writing while holding; illumination means for illuminating the optical disk medium at a prescribed position with a beam in reading and writing; random number generation means for generating a random number sequence $\{r_i\}$ on the basis of a series of multiple-affine key systems rewritten each time when the number of generation times of random numbers reaches a predetermined number; encryption means for encrypting prescribed information given from the outside on the basis of the random number sequence from the random number generation means and outputting the encrypted information; recording means for recording the encrypted information with illumination to a prescribed position of the optical disk medium rotated by the rotation means using the beam illumination means; reading means for reading the encrypted information by sensing reflected light of the beam directed to prescribed position of the optical disk medium rotated by the rotation means by the beam illumination means; and decryption means for decrypting the encrypted information read by the reading means on the basis of the random number sequence from the random number generation means and outputting the decrypted information.

The eleventh embodiment is application of a multiple-affine key system of the present invention to an optical disk recording/reproduction device that performs recording to/reproduction from an optical desk as an object in which digital data is stored. This means a recording/reproduction device that records on and reproduces from, for example, CD-R and DVD on which recording/reproducing a moving picture and the like and thereby there is provided an optical disk recording/reproduction device which blocks reproduction and reading by a third party using a multiple-affine key system capable of self-rewriting, so that a copyright is surely protected.

The present invention in a twelfth embodiment is directed to a radio transmission/reception device used for communication of voice or the like with other radio transmission/reception device through a transmission signal and a reception signal of an RF frequency, which comprises: random number generation means for generating a random number sequence $\{r_i\}$ on the basis of a series of multiple-affine key systems rewritten each time when the number of generation times of random numbers reaches a predetermined number; encryption means for encrypting digital signal corresponding to a supplied voice signal on the basis of the random number sequence from the random number generation means and outputting the encrypted signal; transmission signal modulation means for modulating the encrypted signal to output a first high frequency signal of an RF frequency and transmitting the output through antenna element; received signal demodulation means for demodulating a second high frequency signal of an RF frequency received through the antenna element and outputting the demodulated signal; decryption means for decrypting the demodulated signal supplied from the received signal demodulation means on the basis of random number sequence supplied from the random number generation means and outputting the decrypted signal; and voice signal outputting means for converting the decrypted signal from the decryption means into a voice signal and outputting the voice signal.

The twelfth embodiment is to specify a case where a multiple-affine key system of the present invention is applied to a so-called portable phone and there is provided a radio transmission/reception device which perfectly prevents wire tapping by a third party by performing communication using encryption and decryption with a multiple-affine key system having an automatic rewriting function.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL
VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is an illustration for an encryption communication control procedure of a sixth embodiments of the present invention;

FIG. 5 is an illustration for an example of an authentication procedure employing an encryption method of a seventh embodiment of the present invention;

FIG. 17 is a screen for selection of an encrypted file to be an object for decryption of the application program;

FIGS. 18A and 18B are views showing a start screen and an end screen of the application program;

FIG. 19 is a screen for generation of a decrypted file of the application program;

Figure 23:
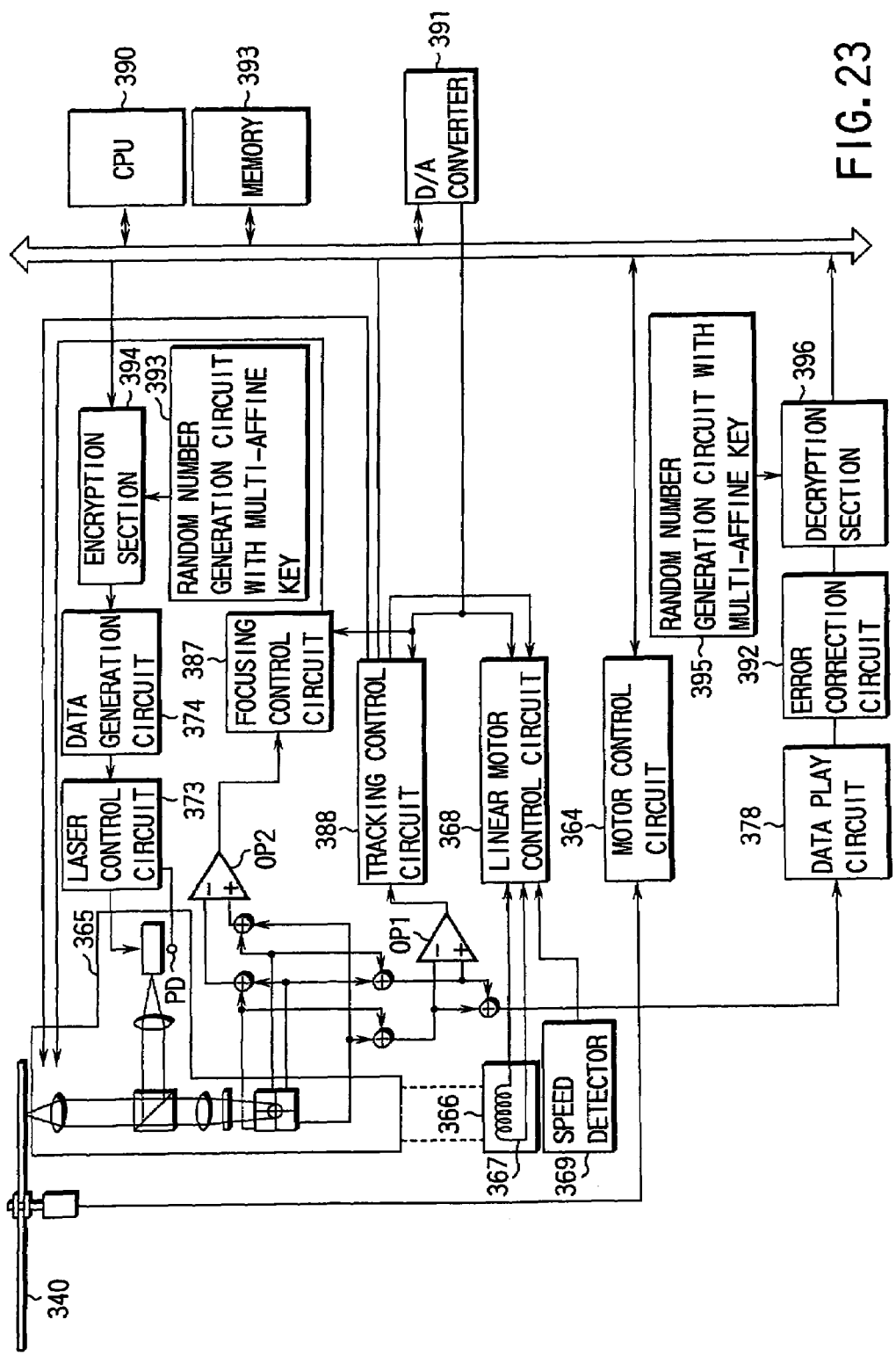
Figure 24:
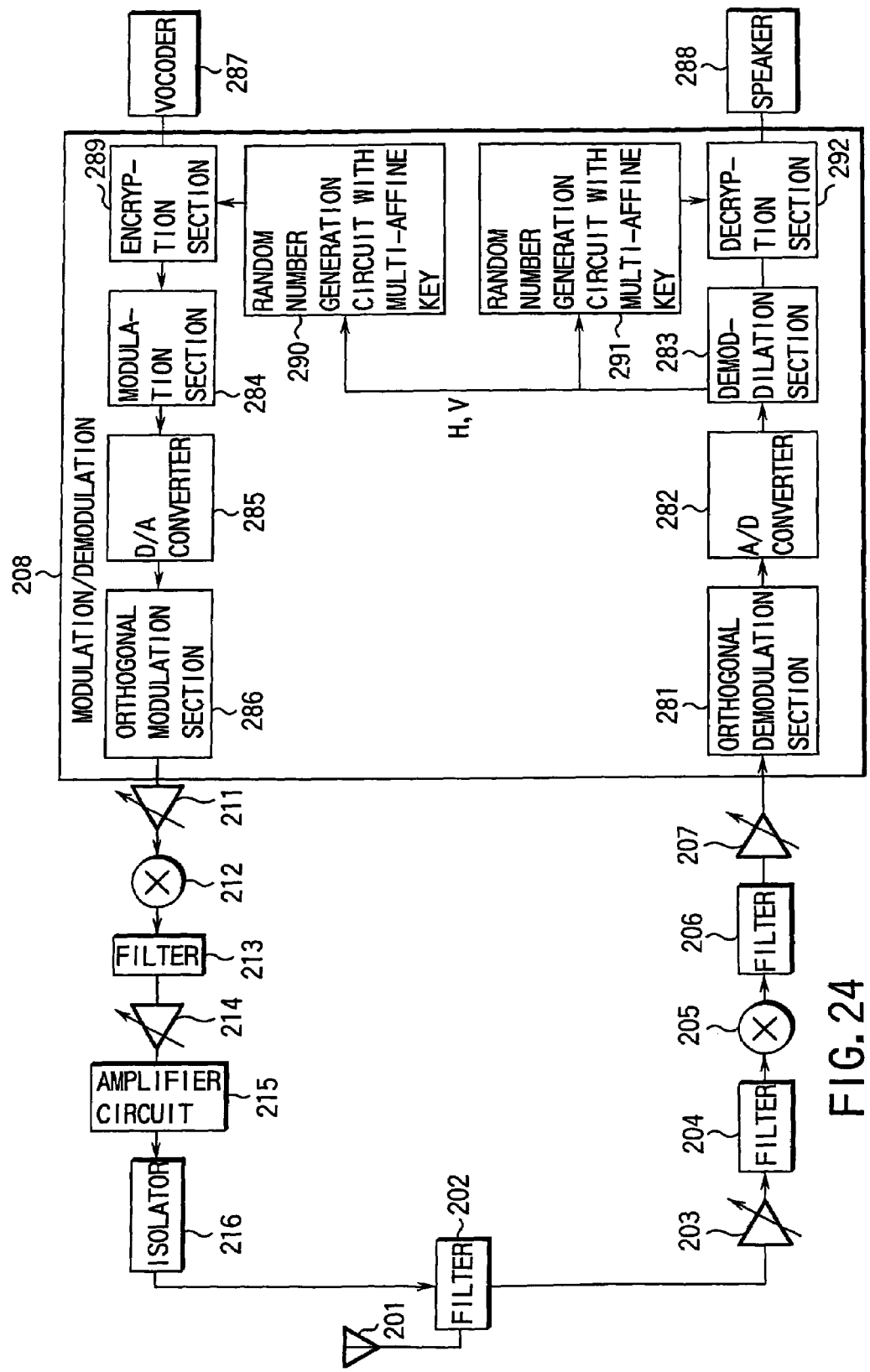

FIG. 23 is a block diagram showing a configuration of an optical disk image recording/reproduction device accompanying encryption/decryption using a multiple-affine key system according to an eleventh embodiment of the present invention; and FIG. 24 is a block diagram showing a configuration of a mobile phone accompanying encryption/decryption using a multiple-affine key system according to a twelfth embodiment of the present invention.

DETAILED DESCRIPTION OF THE INVENTION

Below, embodiments according to the present invention will be detailed with reference to the accompanying drawings. In the embodiments described below, an encryption method, an encryption communication method and an encryption communication system with versatile applications, which enable high-speed processing, and which makes deciphering impossible by providing a stream cipher in which a perfect random number sequence is used only once.

The first to twelfth embodiments will be described in the following order.

The first to third embodiments are ones of an encryption/decryption method.

The fourth to sixth embodiments are ones of a first to third communication apparatuses employing the encryption/decryption method.

The seventh embodiment is one of an authentication method employing the encryption/decryption method.

The eighth embodiment is one of a network system (routers and the like) employing the encryption/decryption method.

The ninth embodiment is one of an application computer program employing the encryption/decryption method.

The tenth embodiment is one of a disk drive employing the encryption/decryption method.

The eleventh embodiment is one of an optical disk recording/reproduction device employing the encryption/decryption method.

The twelfth embodiment is one of a mobile phone employing the encryption/decryption method.

First Embodiment

The first embodiment is to specify fundamental encryption and decryption methods employing a multiple-affine key system of the present invention.

[Outlines of an Encryption Method of the First Embodiment]

In the embodiment, a principle of generation of a random number suited for stream encryption has been searched in order to eliminate a fault of a conventional stream cipher and as a result, encryption/decryption has been able to be realized, which provides a cipher that cannot actually be deciphered, and which enable high-speed processing, adopting an encryption method described below. Description will be made of outlines of encryption of the embodiment.

In the embodiment, stream encryption, which cannot achieve a sufficient protection against a known plain text attack, and conventionally has not been used, is performed using a multiple-affine key system (the multiple-affine key system is a feature of the present invention, a coefficient of each of plural multiple-affine key systems is used as a secret key and the secret key (coefficient) is rewritten each time when the number of use times reaches a predetermined number, and therefore a third party who tries to decipher can be refused).

It has been proved by Shanon that there is no decipherment method for a Vernam cipher, which is a stream cipher, in which a perfect random number is used only once. This means that a perfect encryption that enables high-speed processing can be established if a known plain text attack is eliminated and a generation method for a good quality random number sequence is found.

The present invention has contrived a pseudo-random number generation method to which an undetermined coefficient method cannot be applied and has realized encryption with high reliability by generating a stream cipher with random numbers generated by the generation method.

Particularly, in the present invention, a random number sequence with a good quality are generated using a multiple-affine key system and besides, a coefficient of the multiple-affine key system is rewritten each time of a new start after a prescribed number of generation times of a multiple-affine key system. That is, a multiple-affine key system rewritten each time of a new start after a prescribed number of the generation run times is used as a key in encryption/decryption which is hard to be deciphered by a third party and besides, a plurality of multiple-affine key systems are prepared and the plurality of keys are cross-referenced to automatically update their coefficients in rewriting, whereby deciphering by a third party who employs an undetermined coefficient method is excluded.

Namely, the present invention provides a method in which a lifetime of a key is defined and an aged key (a coefficient of a multiple-affine key system) is automatically rewritten by a new key, i.e, a method in which a good quality random number sequence $\{r_i\}$ is generated with a multiple-affine key system and the sequence is applied in encryption/decryption.

[Description of Affine Key]

Description will be made of a multiple-affine key system that is used in the embodiment below.

An affine key according to the present invention corresponds to a coefficient of a multiple-affine key system for generation of a random number sequence that is used in encryption. An affine key is automatically updated each time of a new start after the prescribed number of generation times of a random number sequence using the multiple-affine key system, thereby perfectly excluding deciphering by a third party.

Assuming a finite field F, the finite field F can be realized by designating a aggregation of integers and an operation on the aggregation. For example, the finite field F can be expressed as F=Z/(p) (p is a prime number) or a galois field of a characteristic p. An affine key on the finite field F can be expressed by four integers K={a, b, c, n} and an action of an affine key K on an integer x ∈ F is defined as follows:

$K(x)=ax+b.$, where c indicates a counter that counts how many times an affine key is used and n indicates the upper limit (lifetime) of the number of times in which the affine key can repeatedly used. An affine key generates pseudo-random numbers of the Lehmer method.

Practically, a multiple-affine key system is adopted in which a plurality of affine keys are employed instead of a single affine key.

A multiple-affine key system comprises: when the number of keys is set to M, a plurality of affine keys $\{K[i]\}$ ($0 \leq i \leq M-1$) and one procedure showing key rewriting processing: procedure w (i, j: integer) in the sense of a structure expression: procedure w (i, j: integer);

$K[i].a=K[j].a \times K[i].a+K[j].b;$ $K[i].b=K[j].a \times K[i].b+K[j].b;$, where multiplication and addition are operations in a finite field now in consideration.

In this procedure, a coefficient a of the ith affine key K[i] to be rewritten can be found to be rewritten based on coefficients a and b of the jth affine keys K[j] as a reference in the rewriting.

Further, a coefficient b of the ith affine key K[i] to be rewritten can be found to be rewritten based on coefficients a and b of the jth affine key K[j].

Encryption can be realized by software and each K[i] is initialized one way or another when the software is started. Unless specifically stated, K[i].b=3 for the reason describe later. Even when control is effected in start of encryption such that an affine key is initialized, a cipher text cannot actually be deciphered as described later.

[Generation Method for Cipher Text]

A procedure of encryption/description of a plain text by a multiple-affine key system which is the first embodiment of the present invention will be described using flowcharts of FIGS. 6 and 7 below.

Figure 6:
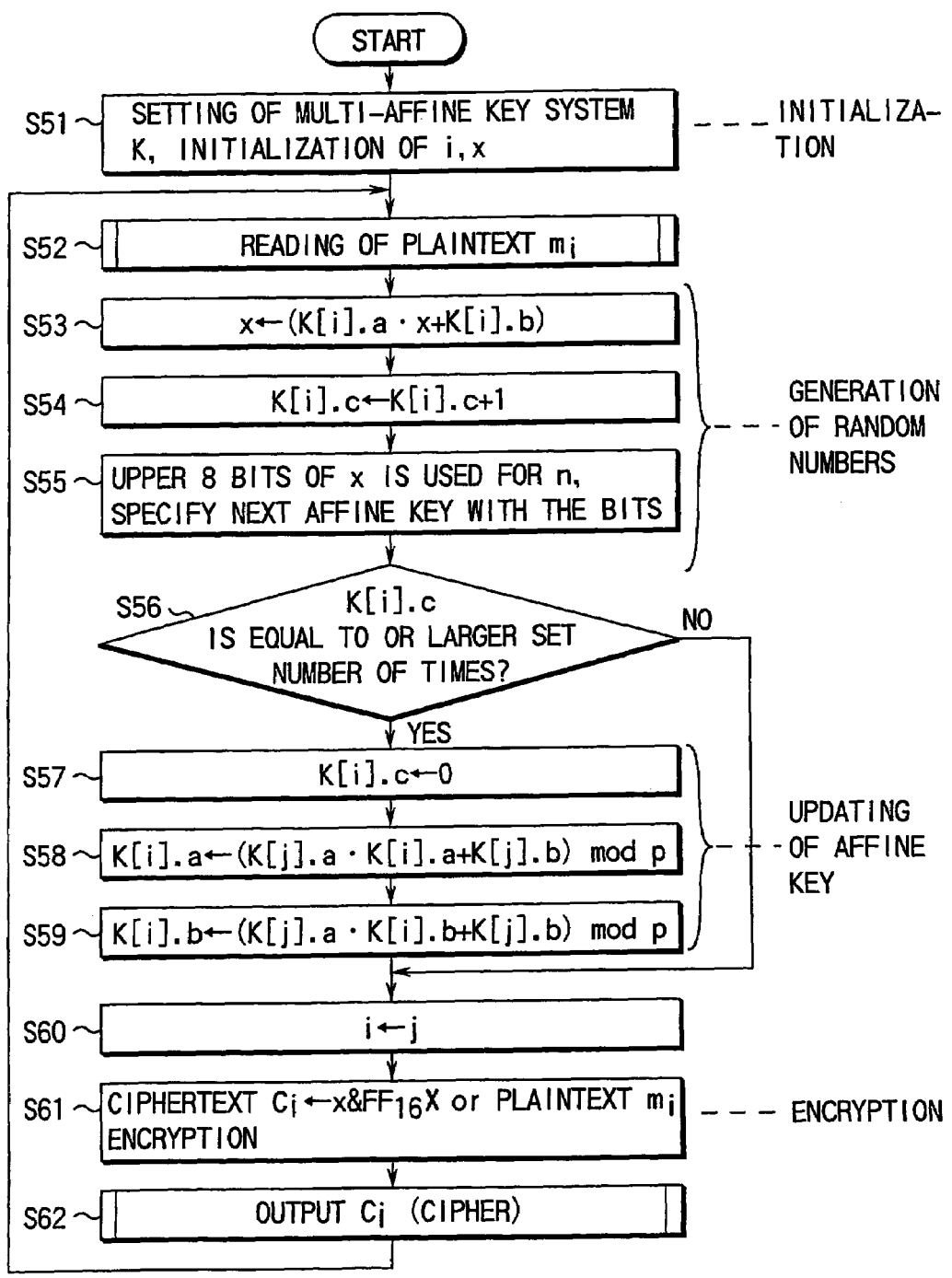
FIG. 6 is a flowchart for describing encryption using a multiple-affine key system according to the first embodiment of the present invention.
Figure 7:
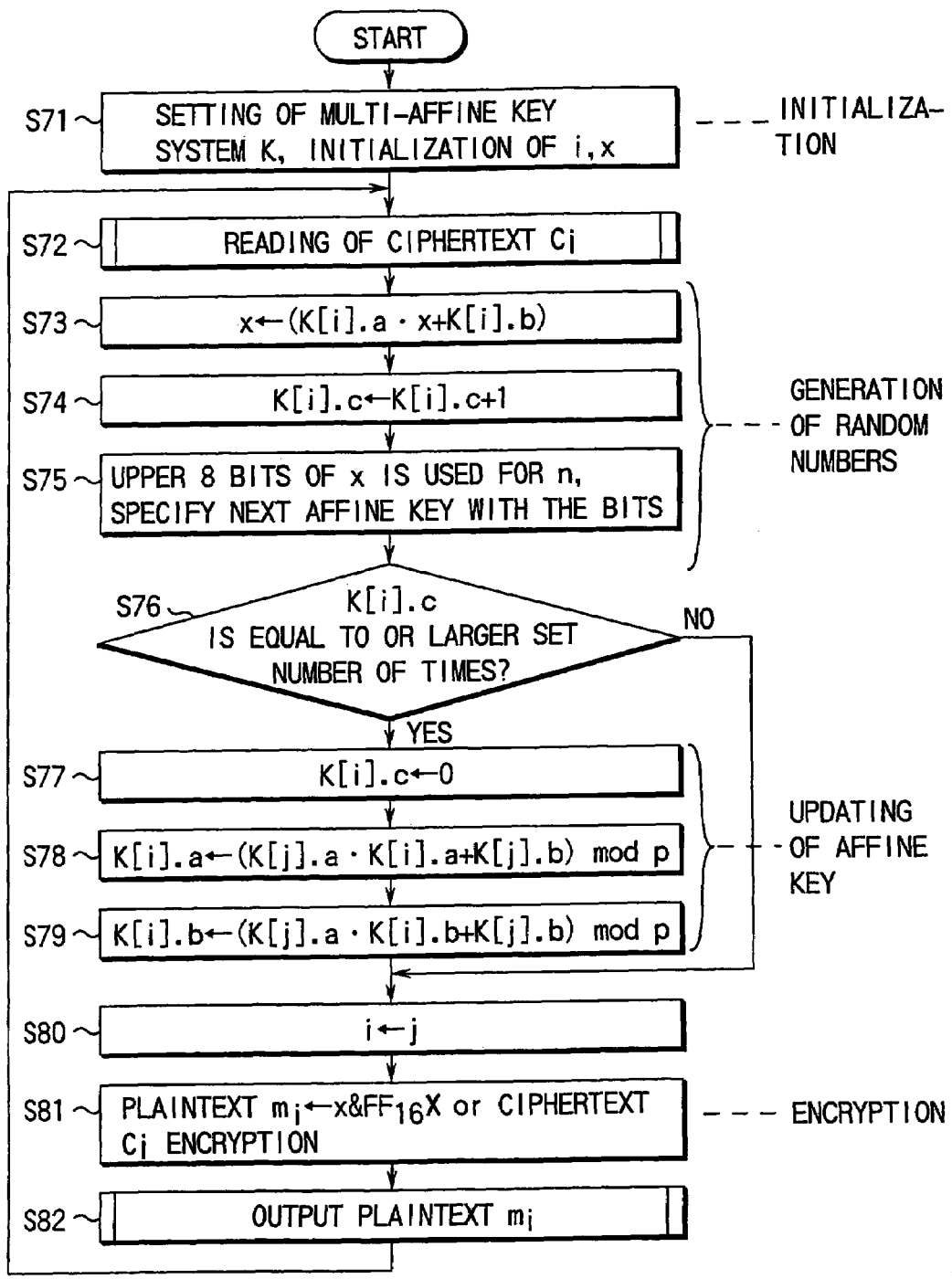
FIG. 7 is a flowchart for describing decryption using a multiple-affine key system according to the first embodiment of the present invention.

In FIG. 6, there is shown a procedure in which a plain text $\{m_i\}$ which is a communication text is encrypted into a cipher text $\{c_i\}$. Here, an initial value $x_0$ of a random number sequence is given and a random number sequence is generated according to the following rule. Namely, at first, steps i to v are executed and thereafter, steps ii to v are repeated and thereby, generation of a random number sequence and generation of a cipher text $c_i$ from a byte string $\{m_i\}$ of a communication text are performed.

Step i

An initial value $x_0$ of a random number sequence is given as i=0.

That is, at first, an initial value $x_0$ of a random number sequence is added to the head of an cipher text to synchronize with each other. Thereby, a multiple-affine key system K is set to initialize $K_i$ and x (S51).

Step ii

Then a plain text $m_i$ is read in (S52) and a random number sequence $\{r_i\}$ is generated according to the following procedure using a affine key K[i] (S53 and S54).

$x_i=K[i](x_{i-1}), K[i].c=K[i].c+1$

Then, if K[kn].c is equal to or less than the set number n of times, since there is no necessity of key updating, an exclusive OR is performed on the generated random number sequence $\{r_i\}$ with the plain text mi to encrypt a cipher text $\{C_i\}$ (S60 and S61) and the thus obtained cipher text $\{C_i\}$ is output (S62).

$c_i=m_i(xor)\ (xn\ and\ 255)$

Step iii

Further, here n is expressed as the upper 8 bits of x and thereby, an affine key K used at the next stage is specified (S55).

$j=(x_n\ shr\ 8)\ and\ (M-1),$ where M indicates the number of keys and is a power of 2.

Step iv

If K[i].c≧K[i].n, w (i, j) is executed, the result is K[i].c=0.

Namely, if the number of times has reached the number of times at which rewriting is required, the procedure w (i. j) for the rewriting is executed and the coefficients a an b of the multiple-affine key system are rewritten (S57 to S59).

Step v i=j is set.

Program flow returns to the step ii and processings from step ii to step v are repeated on following communication texts. In the flowchart of FIG. 6, the above procedure corresponds to a program course from step S62 to step S52. That is, in the following processings, encryption/decryption processings are effected while automatically rewriting a multiple-affine key system and a random number sequence.

In this case, since a multiple-affine key system {K[i]} is rewritten in the same way at the other communication party, both parties can share common key information as far as synchronization is retained and therefore, can perform communication and the like without including encryption key information in communication texts in both ways.

[Deciphering Method for Cipher Text]

Description will be made of deciphering processing of a cipher text by a multiple-affine key system of the present invention using the flowchart of FIG. 7. A procedure of the deciphering method of a cipher text may be considered to be almost the same as that of a generation method of a cipher text.

That is, there is a necessity to generate a random number sequence similar to in the case a cipher text is generated and accordingly, when a setting of a multiple-affine key system K, and initialization (S71) of i and x are not same as the processing of step S51 of the encryption, the same random number sequence $\{r_i\}$ can not be obtained.

Therefore, a procedure of generating a random number sequence (S72 to S75) is required to be same as the procedure of generating a random number sequence (S52 to S55) in the encryption and besides, rewriting (S76 to S79) of an affine key is also same as the rewriting (S56 to S59) in the encryption.

Finally description will be made of a decryption part. While in the encryption, an exclusive OR is performed of the plain text $m_i$ with the random number sequence $\{r_i\}$ (S60 to S62), in the decryption an exclusive OR is performed of a cipher text $\{C_i\}$ with an obtained random number sequence $\{r_i\}$ (S80 to S82), thereby generating the original plain text $m_i$, which part is also very much similar to in the encryption. After all, it is not wrong even if the encryption and the decryption are said to be almost same as each other.

[Nature of Ransom Number Sequence]

A random number sequence $\{r_i\}$ generated by the above described method by a multiple-affine key system has a very long cycle. According to an experiment, even when two affine keys are employed, a cycle exceeds $M^2$. When three or more affine keys are used, a cycle is too long to measure. Further, it is confirmed that a high degree non-dense crystalline structure of a random number sequence that is problematic in the Lehmer method does not also exist.

From the above description, multiple-affine key system encryption that generates a stream cipher using a multiple-affine key system apparently has very high security.

In such a manner, a random number sequence $\{r_i\}$ generated by a method using a multiple-affine key system is a good random number sequence, a cycle of repetition is so long as is regarded as nothing and a random number sequence generated by this method can be applied not only to encryption but also to various kinds of processings with a good result.

For example, a good result can be obtained in numerical integration using the Monte Carlo method as well and even in an general operation that requires immensely voluminous computational time, a good result with a little error can be achieved in a little computational volume if each operation result is evaluated while repeatedly conducting prescribed times of operations using random numbers generated in the above method. Hence, by applying thus obtained random number sequences to various processings using random numbers, good results with uniformity can be attained.

In the embodiment, a random number sequence $\{r_i\}$ is integer value with 16 or more bits. The lower 8 bits are used for encryption while the upper 8 bits have no relationship with encryption and used as data for selecting a key number. The data of the upper 8 bits is information that cannot be seen from outside the key.

In encryption of the embodiment, the number of keys are not definite and even if the number of keys is increased, no adverse influence is visibly exerted on an encryption speed. The number of keys is usually in the range of 2 to $2^8=256$. The encryption is conducted while the affine keys are constantly updated at a given probability. Therefore, it is very difficult to specify an encryption key. When an encryption key cannot be specified, a cipher of the embodiment can be regarded as a Vernam cipher which cannot theoretically be deciphered and can be regarded as a cipher for which no deciphering method is available.

[High Speed Processing for Cipher]

In an embodiment described below, the following method is employed in order to realize high-speed encryption/decryption while taking the above described circumstances into consideration and therefore, one time multiplication is sufficiently executed for generating one random number. Further, updating of an affine key at a given probability can be realized with two-time multiplication and a division that requires a comparatively long computational time is not required.

When the upper limit of updating of a key is a constant N=K[i].n, 2/N times of multiplication by an integer are on average employed to an updating of a key. That is, the average number of multiplication times by an integer per one byte is $\{1+(2/N)=(N+2)/N\}$. When N=3, a value of the average times is of the order of 1.666 . . . . That is, while the longer an encryption key, the higher the security, multiplication by an integer is less than 2 times per one byte on average.

K[i].a and K[i].b are unknown numbers of 4 bytes in total as viewed from an attacker against a cipher and when N=3, if random numbers each with 3 bytes are employed in the encryption, the key is rewritten. Hence, an affine key system is extremely secure.

When $n_i$=K[i].n is randomly set based on information on a secret key, a key lifetime is longer and a processing speed of encryption is increased on average. While a cipher is easier to be deciphered correspondingly, the cipher can be regarded as being impossible to be deciphered for the following reason.

Some of the affine keys have a lifetime of $n_i$=3. The keys are comparatively frequently rewritten. Rewriting of one key has an influence of generation of random number directly after the rewriting in terms of a probability. Even when the key is used only once, thereafter an affine key system itself generates a completely different random number sequence. The average number of multiplication times is $1+(2/M)\Sigma 1/(n_i)$ (M: the number of affine keys).

The value is 1.0618 in a case where M=32, the number of keys of $n_i$=3 is on the order of 5, the range of random numbers $\{n_i\}$ is in the range of $3 \leq n_i \leq 500$. While the value is dependent on a way of generation of random numbers $\{n_i\}$, there is no chance to exceed 1.1 virtually. That is, a high-speed processing can be realized by an increase of 50% compared with the above case with the highest security.

Further, when the number of affine keys is increased, a degree of security is increased due to more keys than with an initial case, but an encryption speed is slightly increased. Accordingly, it is more advantageous as the number affine keys is larger as far as the increase is still accepted in a primary cache memory of CPU.

When the encryption method described above is adopted, an excellent effect that an encryption processing speed does not decreased even if a degree of security is higher can be obtained.

[Proof of Impossibility of Deciphering of Ciphertext]

Description will be made of security of the encryption method of the embodiment described above.

It is only the Vernam cipher that has been proved that no way to deciphering is available. The Vernam encryption technique requires a perfect random number sequence with a length same as a plain text as a secret key which is impractical. An cipher of the embodiment is a practical cipher that is improved from the Vernam key solving such a problem and therefore, the cipher of the embodiment has a perfect confidentiality in the following sense.

That is, a multiple-affine key system K={K[i]} employed in encryption of the embodiment is considered.

If lifetimes of all the affine keys K[i].n, are for example, 3, at this point, perfect confidentiality of a cipher text with 3 bytes is established.

The reason why is confirmed by experiments described below. Incidentally, assuming a case of one key, if confidentiality of a cipher text can be proved in the case, the same apparently applies to a case of a multiple-affine key system.

Now, it is assumed the following processing is performed with an affine key being K.

Step i

A random number sequence $r_1$, $r_2$ and $r_3$ each being an integer with 8 bits is arbitrarily generated. Affine keys are prepared in the following way.

Step ii

K={a, b, c, n} is set and the upper 8 bits are indicated by $a_2$ and the lower 8 bits are indicated by $a_1$. Likewise, the upper 8 bits of b are indicated by $b_2$ and the lower 8 bits are indicated by $b_1$. An initial value $x_0$ of a random number is also considered to be composed of the upper 8 bits $x_{02}$ and the lower 8 bits $x_{01}$. That is, $$a=256*a_2+a_1, b=256*b_2+b_1,$$

$$x_0=256*x_{02}+x_{01},$$

where the upper 8 bits are multiplied by 256 to substantially shift by 8 bits.

Step iii

Here, one of $a_1$, $a_2$, $b_1$ and $b_2$ is absolutely at random determined. For example, a particular value such as $a_1=41$ is specified and the following processings are effected, wherein $x_{01}=r_i$.

Step iv

When $a_2$, $b_1$, $b_2$ and $x_{02}$ that are the rest excluding $a_1$ the value of which has provisionally been determined are properly selected and an affine key K is prepared, three random numbers generated with the K can coincide with the above $r_1$, $r_2$ and $r_3$. This can be confirmed through an experiment on a simple program.

Therefore, even if deciphering is tried with the algorithm, which leads a result that solutions are obtained in number close to infinity, it is impossible for an attacker to specify a correct one of those solutions resulted from the deciphering.

In other words, as for a cipher with 3 bytes, the proof has been done that there is no means for deciphering an cipher of the embodiment.

Besides, when a general multiple-affine key system K={K[i]} is considered and it is further assumed that lifetimes K[i].n of all affine keys are set to 3, the proof can be done by the following method that a cipher by the multiple-affine key system has no way of deciphering.

At first, it is assumed that random numbers each with 3 bytes are generated by k[0]. In this stage, K[0] cannot be specified. It is apparent that there is a necessity to investigate some more bytes of random numbers in order to specify K[0].

Then, it is assumed that K[0] reaches the end of its lifetime since encryption of 3 bytes has been done and is rewritten by K[1]. At this point, a necessity to specify K[1] arises in order to specify K[0]. However, K[1] is rewritten by a different key after K[1] is used three times, which makes it impossible to be specified.

It is further assumed that K[1] is rewritten into K[2]. Then, a necessity to specify K[2] arises in order to specify K[1]. Thus, it is understood that there is no way but to specify all the affine keys at the same time in order to specify a key in the multiple-affine key system. Eventually, there is no deciphering method but to investigate possibilities of all the keys one by one.

When the number of keys in the multiple-affine key system K={K[i]} used here is set to N, the number of possible multiple-affine key system systems is more than $p^{2N}$ even in the case of p=65521. The number of the systems is more than $10^{308}$ even in the case of N=32.

Accordingly, if the lifetime K[i].n of only one key of multiple-affine key systems is 3, there is as a matter of fact no way of deciphering, which leads the fact that the cipher of the embodiment cannot be deciphered regardless of lifetimes of the other keys.

[Description of Practical Model]

A practical model of the above described encryption will be described.

In the practical model of a most secure example, a finite field is F=Z/(p), where p=65521, the number of affine keys is 32, a timing of rewriting is K[i].n=3, where K[i].c=K[i].a (mod 3).

A secret key in this case is 64 integers of the 16 bits.

An initial value is desired to be attached to the head of each cipher text. For example, it may be predetermined that after processing in which random numbers are generated with an initial value as a start using a multiple-affine key system is executed the prescribed number of times, random numbers generated and a state of a key at this time are used in encryption. When this method is adopted, a known plain text attack can effectively be blocked.

In this case, the total number of affine keys is $p^{64}=$ 17715487023188615785862006993437679072244696797392376378351823183249316438696650013602454660660196822002674703376447693568890302349283266135209706072223367290017275413556117806498193036538397610938501551207585724764237660265224472380655047321515176911644868009436396098311988175118973682495361451848962 1191681, which number of digits is 309. This number is considered to be larger than the number of elementary particles in all the universe and thereby deciphering cannot be executed practically.

In the first embodiment described above, a method in which an initial value $x_0$ is attached to the head of a cipher text is described, however, the present invention is not limited to the above embodiment, but the same secret key can repeatedly be used in the following method in which application to communication between groups is effected.

Second Embodiment

Figure 8:
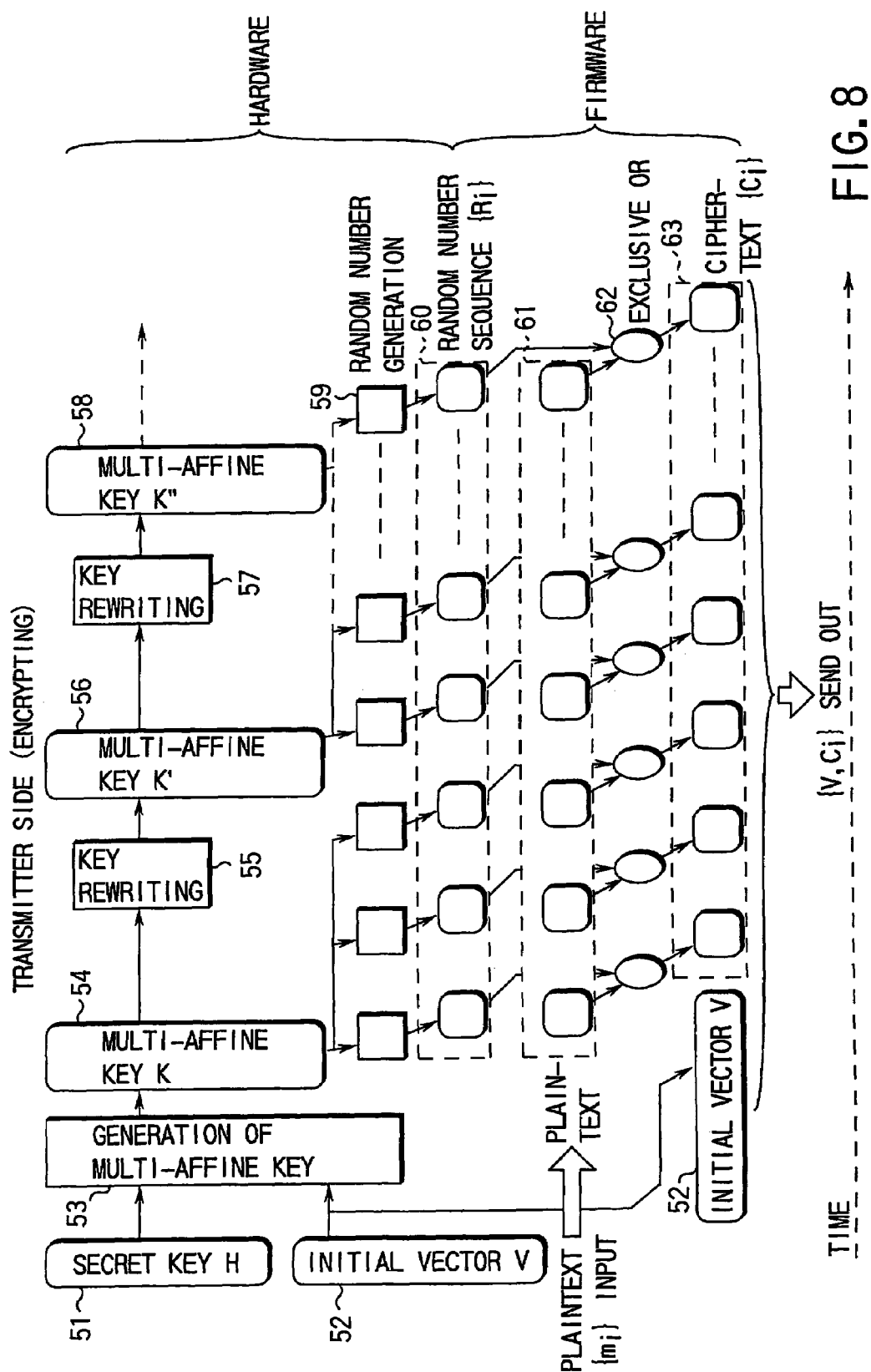
FIG. 8 is an illustration for encryption using a multiple-affine key system according to the second embodiment of the present invention.
Figure 9:
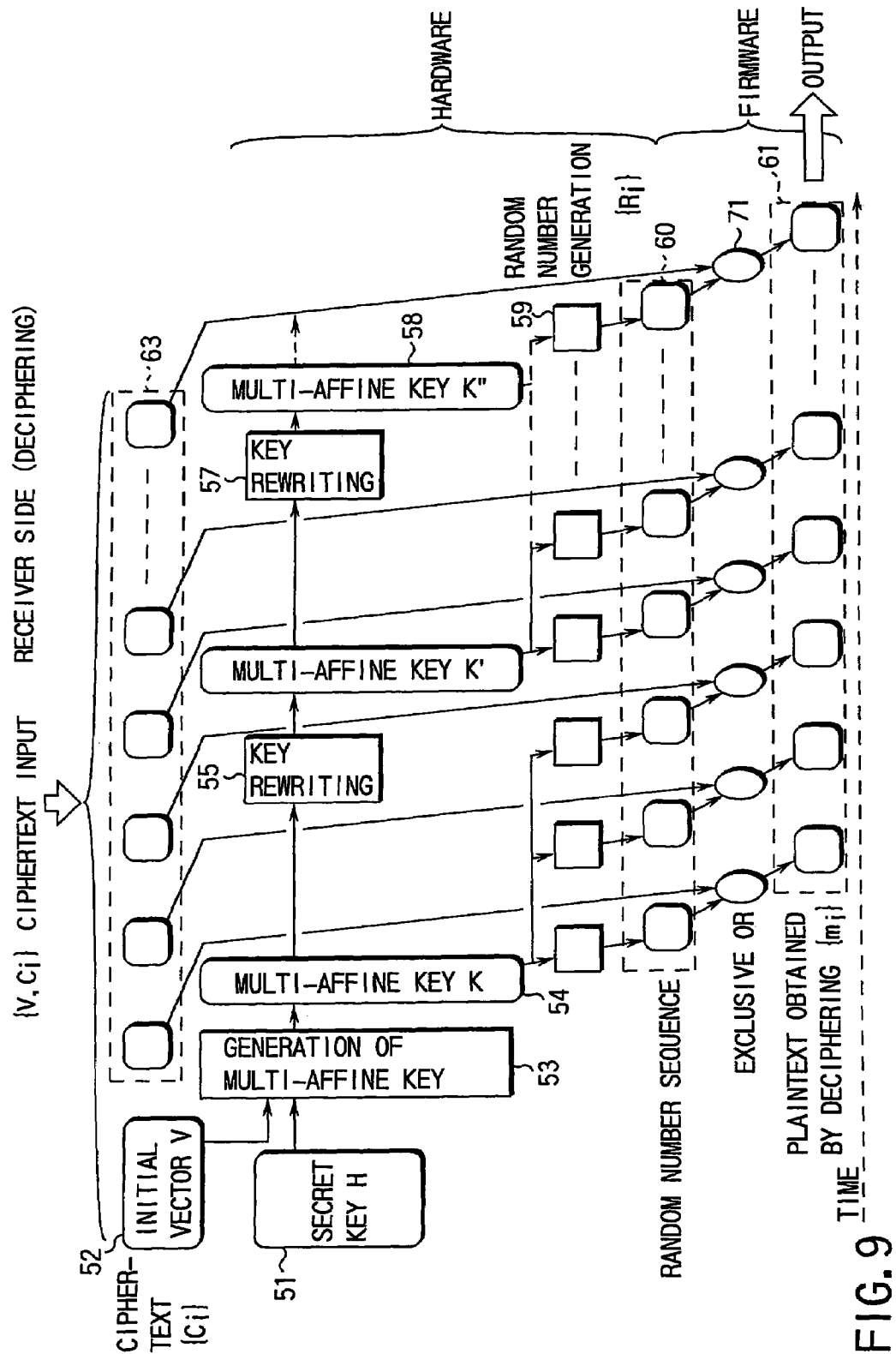
FIG. 9 is an illustration for decryption using a multiple-affine key system according to the second embodiment of the present invention.

The second embodiment, as shown in FIGS. 8 and 9, is not to generate random numbers with a multiple-affine key system given initially but to specify methods of encryption/decryption when a random number sequence is generated with a multiple-affine key system generated on the basis of a secret key H or an initial vector V.

In the mean time, in the second embodiment as well, description will be made of a case where a finite field same as in the first embodiment described above is employed as an example. In this case, there are conceived "first method" and "second method".

[Application to Communication Between Groups]

A method which will be described below is suited to a case where a communication party performs communication with a plurality of other communication parties $\{Bob_j\}$. In this case, the communication party shares a common secret key H with the other parties $\{Bob_j\}$. The other parties $\{Bob_j\}$ attach an initial vector V including an initial value v that is one value of a hexadecimal notation to the head of a cipher text. The cipher text is prepared according to the following procedures:

<First Method>

Step i

FIG. 8 is an illustration for encryption using a multiple-affine key system according to the second embodiment of the present invention.

In FIG. 8, the other communication parties $\{Bob_j\}$ perform generation (53) of a multiple-affine key system K (54) on the basis of the common secret key H (51) and the initial vector V (52).

Step ii

A random number sequence $\{r_i\}$ is generated using a multiple-affine key system K with the random number value $x_0$ at this point as an initial value (59 and 60) and an exclusive OR (62) are performed with the random number sequence $\{r_i\}$ to encrypt a communication text $m_i$, thereby outputting a cipher text $\{C_i\}$ (63).

Step iii

Thereafter, as in FIG. 8, $(V, C_i)$ as a cipher text is sent to the communication party through a network or the like.

A rewriting processing (55 and 57) of a multiple-affine key system K, which is a feature of the present invention, is automatically effected each time when the multiple-affine key system has been used a predetermined number of times, which makes encryption by a third party impossible.

The communication party (Alice) who has received the cipher text decrypts the cipher text according to the following procedure. FIG. 9 is an illustration for decryption by a multiple-affine key system according to the second embodiment of the present invention.

Step i

In FIG. 9, in a case of deciphering, the initial vector V and the cipher text $C_i$ are first received (63) and then, as in the encryption, a multiple-affine key system K (54) is generated (53) on the basis of the secret key H (51) and the initial vector V (52).

Step ii

Then, the random number value $x_0$ at the time point when the multiple-affine key system is generated is used as an initial value together with the multiple-affine key system K to generate a random number sequence $\{R_j\}$ (59). Deciphering of the cipher text is conducted by operating an exclusive OR (71) of the random number sequence $\{r_i\}$ with an input cipher text $\{C_i\}$, thereby outputting a deciphered plain text $m_i$ (61).

The rewriting processing (55 and 57) of a multiple-affine key system which is a feature of the present invention is automatically conducted each time when the multiple-affine key system has been used a predetermined number of times, which makes deciphering by a third party impossible.

With the above processings, decryption of a cipher text can be realized.

Since a third party who has no common secret key H cannot have any knowledge of the multiple-affine key system K, the third party cannot decipher the cipher text. Further, since this method uses a virtually different key each time, security can forever guaranteed. However, an initial vector V with 130 bytes is attached to the head of a cipher text each time of deciphering.

This part of processing can be simplified as follows according to an application. That is, an initial value $x_0$ and information ($\alpha$ and $\beta$) on key transformation are attached to the head of a cipher text $\{C_i\}$ and a new multiple-affine key system K is generated from a common secret key H using the attached initial value $x_0$ and the information ($\alpha$ and $\beta$), thereby encryption may be performed.

A procedure of communication control in this case will be described below:

<Second Method>

Step i

The other parties $\{Bob_j\}$ encrypt key transformation information ($\alpha$, $\beta$) which is composed of two numbers in hexadecimal notation using an initial value v, which is one number in a hexadecimal notation and a secret key H. Namely, the key transformation information ($\alpha$, $\beta$) is computed in (mod p) to be encrypted into ($\alpha'$, $\beta'$).

Step ii

A multiple-affine key system K is generated using key transformation information ($\alpha'$, $\beta'$) from the secret key H.

Further, a new multiple-affine key system $K=\{K_1, \ldots, K_{64}\}$ is prepared from a secret key $H=\{H_1, \ldots, H_{64}\}$ and a multiple-affine key system $K_i = \alpha' H_i + \beta'$ (mod p).

Step iii

Then, random numbers $r_i$ are generated using the thus generated multiple-affine key system K according to the algorithm to prepare a cipher text C of the plain text $m_i$. [v, $\alpha$, $\beta$, C] as the cipher text is supplied on a network to send the cipher text to the communication party.

In a case where the cipher text is deciphered as well, likewise, random numbers $r_i$ are generated using an affine key generated through transformation of a common secret key H by the key transformation information ($\alpha'$, $\beta'$) to perform decryption. In this case, one secret key H can be used in times: $p^3 = 281281747415761$. According to the second method, the original cipher text is extended by only 6 bytes in length by the key transformation information, which is different from the case of the first method.

Third Embodiment

The third embodiment is to specify an embodiment in which processing speed is increased by simplifying a computational method used in random number generation. That is, here, when Z/(p): (p=65521) is used as a finite field, a computation of (mod p) is conducted along with multiplication by an integer. Since the computation of (mod p) is performed in a delayed timing by one or more times of multiplication by an integer, it will be studied whether or not the computation (mod p) can be replaced with a higher speed "and $(2^{16}-1)$" or the like. If the replacement is enabled, the operation means virtually to perform computation of (mod $2^{16}$) in integers.

When all computation is executed by a method in which the computation is replaced with "and $(2^{16}-1)$" or the like, the multiple-affine key system is gradually degenerated and all components of a key are sometimes changed into "0". That is, in this computation, there is a very high possibility not to maintain complexity of a key. Contrary, only multiplication by an integer in generation of a random number sequence $r_i$ is computed in the following equation: $x_i=(k[i].a \times x_{i-1}+K[i].b$ and $(2^{16}-1)$ and the rewriting of a key is computed in (mod p) as is conventionally, whereby random numbers are comparatively good.

In the above described method as well, however, a computation in the case of K[i].b=0 is simply multiplication by an integer and if K[i].a is an even number, a random number to be generated has a high probability to be 0. Therefore, in the case of K[i].b=0, K[i].b=0 is forcibly rewritten into K[i].b=1.

Further, in the case of K[i].a=0, since the same key is repeatedly used, K[i].a is changed to 17, where a cycle of multiplication is long. A number 17 is a primitive root for p=65521. When this part was improved, a speed of processing was be able to be increased by 50% or more.

Below, description will be made of an encryption algorithm stepwise.

[Encryption Algorithm Using and]

A multiple-affine key system K={K[i]}, where K[i]={a, b, c, n}, is discussed. A random number computed in (mod p) is used as {a, b, c, n}. Further, p=65521 is set.

Herein, a function of an affine key K[i] on an integer x is assumed to be as follows:

$$K[i](x)=(K[i].a \times x+K[i].b) \text{ and } (2^{15}-1)$$

It has been already described that when this computation is applied even to rewriting of a key, complexity of a key cannot be maintained. Further, since disorders sometimes occur in random numbers to be generated, though at a low probability, a procedure w ($\alpha$, $\beta$) for rewriting is altered in the following way in the third embodiment:

```
K[i].a: = (K[j].a×k[i].a+k[j].b)mod p;
K[i].b: = (K[j].a×k[i].b+k[j].b)mod p;
if K[i].b = 0 then
begin
    k[i].b: = 1;
    if K[i].a = 0 then
    begin
        k[i].a: = 17;
    end;
end;
```

With the above change, encryption is accelerated and complexity of a multiple-affine key system can be maintained. Incidentally, a number 17 is one of primitive roots and another primitive root exerts a similar effect.

A unit of (computer) processing is set to 16 bits, this is because a processing unit of a control section is 16 bits (byte unit) and because the 16 bits are divided into the upper 8 bits and the lower 8 bits in the processing. The largest prime number in the 16 bits is P=65521 and thereby the value is utilized. In a case where a processing unit is not a byte unit in the control section, the processing unit is not limited to the above one.

[Procedure for High-Speed Encryption]

There is below shown a procedure for encryption in the third embodiment which enables the highest speed encryption.

A communication party (Alice) and the other communication party (Bob) share a secret key H and a communication text $m_i$ is sent from the one communication party to the other communication party. Below, description will be made of a case where the number of affine keys is 64. The number, however, is naturally not limited to this particular number.

Step i

The communication party (Alice) first prepares one initial value v in the hexadecimal notation and an initial vector V, which is 128 integers having random numbers as component.

Step ii

The communication party uses the initial value v and the secret key H to encrypt the initial vector V. The result is computed in (mod p) to be a multiple-affine key system K.

Further, a multiple-affine key system K[i].n is set using the secret key H as follows.

$$K[i].n=(i=0, 1, 2, 3, 4)$$

$$K[i].n=\{K[i].a(\text{mod } 500)\}+3 (5 \leq i \leq 63)$$

Step iii

The communication party adopts the random number value $x_0$ at this point as an initial value and encrypts a communication text $m_i$ into a cipher text $\{C_i\}$ using a multiple-affine key system K according to the encryption method described above.

Step iv

Finally, the communication party transmits {V, C} to the other communication party through a network.

In such a way, since a third party other than the communication party and the other communication party does not know of a secret key H which is key information, the third party cannot obtain a multiple-affine key system K. Since many {initial vector V} exist, a different affine key K is used each time of encryption. Furthermore, random number sequences $\{r_i\}$ generated with two different affine keys K are considered to have no correlation therebetween, which makes a known plain text attack meaningless.

[High Speed Decryption]

When the other communication party receives a communication text, the cipher text is decrypted in the following procedure:

Step i

The other communication party (Bob) encrypts K' using the common key K with an initial value as $x_0$. As a result, the other communication party can acquire the same multiple-affine key system as that the communication party (Alice) has by setting H=K(K') in (mod p).

Further, H[i].n is also set using K as described above.

Step ii

When C is encrypted with H, then a communication text M can be achieved.

In such a way, high-speed encryption can be realized, a processing speed can be increased by a factor of about 2.5 compared with the first embodiment in which security receives high attention. For example, when encryption is performed with the latest high-speed personal computer (made by Intel Co., loaded with CPU pentium II having an operating clock 450 MHz) on a file having 10485 Kbytes, it is confirmed that the encryption is completed in the order of 0.84 sec. This means that encryption is processed at a rate of 100 Mbits per second. This shows that the encryption is effected at a speed three times or more that in a case of all the existing encryption systems.

The multiple-affine key system encryption system described in the embodiment defines an apparatus for generating a random number sequence with 8 bits. While the apparatus is realized by only software, random numbers can be generated at a rate of 100 Mbits per second. The random numbers are excellent in the following points:

The random numbers are generated at a higher speed than in the Lehmer method in which the processing is executed in prime number p (mod p);

The random numbers are excellent in quality compared with those generated by the Lehmer method;

The random number sequence generated by the above described algorithm has a very long cycle and thereby, the sequence can be regarded to have virtually no cycles;

Even if the number of affine keys is increased in order to generate more complex random number sequence, a processing speed is not decreased, and Even if part of an affine key is altered into a key constituted of a higher degree polynomial so that the random numbers are improved, almost no speed reduction actually occurs.

For such features, even when a specific chip is produced in order to effect the above encryption processing, the chip can be applied to a chip for other types of a high-speed random number generation, one of which can utilize realtime application of the Monte Carlo method.

Fourth Embodiment

Figure 1:
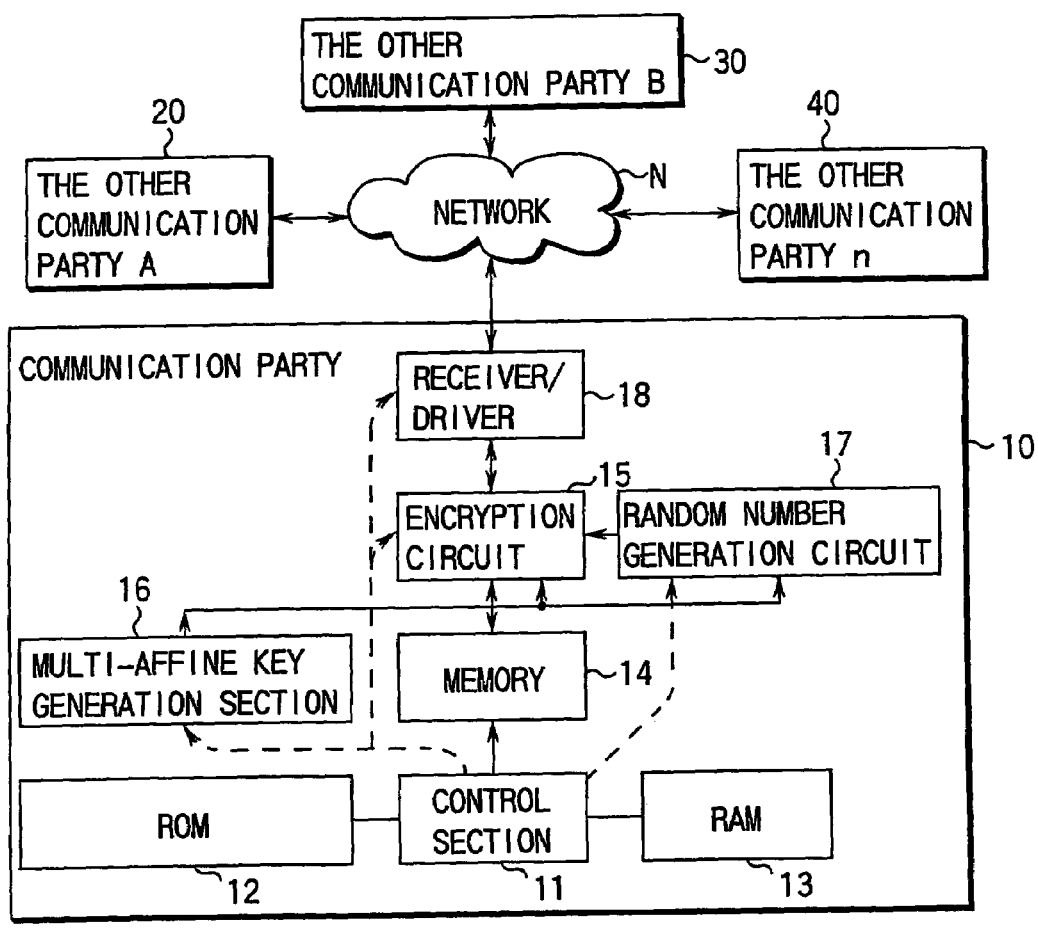
FIG. 1 is a block diagram showing a system configuration of an encryption communication system as a common embodiment according to first and fourth embodiments of the present invention.

The fourth embodiment, as shown in FIG. 1, is to specify a configuration example of an encryption system in which the above described encryption methods are concretely adopted and the configuration is one in which a fundamental encryption/decryption method using a multiple-affine key system of the first embodiment is employed. FIG. 1 is a diagram showing a configuration of a data communication system realizing data communication by the encryption method above described.

In FIG. 1, the communication party 10 is connected to the other communication parties 20, 30 and 40 through a network N. Since the communication party 10, the other communication parties 20, 30 and 40 have configurations similar to one another, a detailed configuration is shown on the communication party 10 as an example. Incidentally, the other communication parties are respectively provided with similar configurations and therefore, the above-described encryption/decryption can be conducted.

A communication apparatus 10 of the communication party comprises a control section 11 for governing control of the entire apparatus according to control procedures stored in ROM 12, ROM 12, RAM 13, a memory 14 for holding communication data; an encryption circuit 15 for not only encrypting a communication text held in the memory 14 but decrypting received encrypted information from a receiver/driver circuit 18, an affine key holding section 16 for generating and holding an affine key in encryption, a random number generation circuit 17 for generating random numbers according to an affine key held by the affine key holding section 16 and the receiver/driver circuit 18 for not only transmitting to the other communication party a cipher text from the encryption circuit 15 through a network N but receiving encrypted information and the like from the other communication party.

[First Communication Control Procedure]

Figure 2:
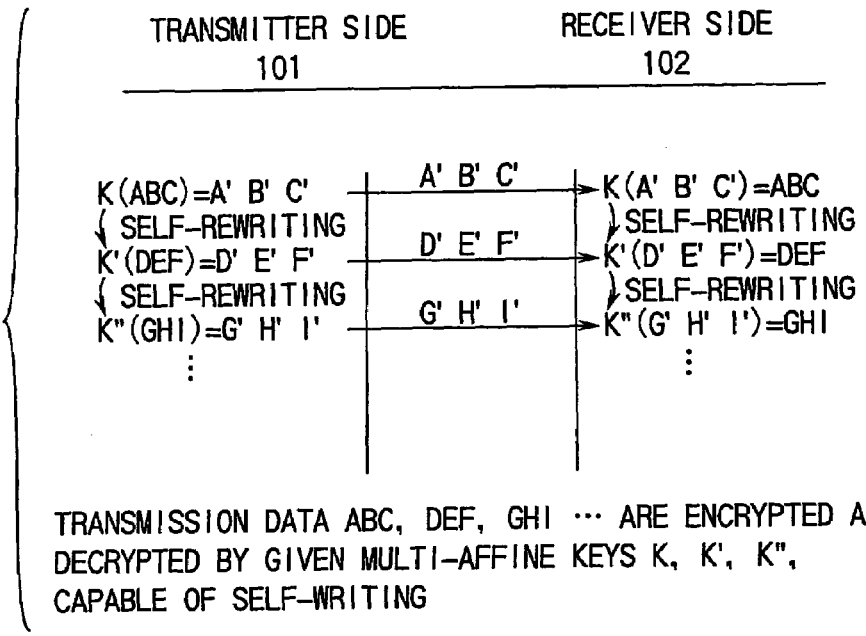
FIG. 2 is an illustration for an encryption communication control procedure of the first and fourth embodiments of the present invention.

The first communication control procedure in a communication system having such a function is shown in FIG. 2. The first communication control procedure shown in FIG. 2 is a method in which a high-speed encryption communication can be performed, and an affine key is continuously used while automatically rewriting. The communication procedure is suited to one-to-one communication such as communication between departments and sections in one company, between a head office and one of branch offices in one company, or the like.

Now, it is assumed as preconditions that common multiple-affine key systems K are respectively held by the affine key generation sections 16 of both apparatus and the random number generation circuit 17 generates a random number sequence $\{r_1, r_2, r_3, \ldots\}$ using a multiple-affine key system K. Accordingly, encryption/decryption of data ABC is X (ABC)=$\{A(xor)r_1\}, \{B(xor)r_2\}, \{C(xor)r_3\}$.

A multiple-affine key system is rewritten each time when communication is performed as shown FIG. 2. Further, both the transmitter side and the receiver side have rewritten affine keys respectively, and both respectively generates random number sequences by the rewritten affine keys and use generated random number sequences to perform encryption/decryption.

That is, a multiple-affine key system is rewritten each time when new communication is performed and a rewritten multiple-affine key system is held in the affine key generation section 16. Thus, since key information is not fixed, an encryption method with vary high security can be established.

However, since it is conceivable that both affine keys are not common with each other, for example when a trouble occurs on communication, it is desirable that a sequence that leads to recovery of a commonality in affine key on request from one party is provided.

As such a sequence, it may be acceptable that affine keys on respective sides can be reset to affine keys set in predetermined initial setting conditions even by transmission of an affine key from one side.

According to this method, since there is in principle no transmission of key information in communication between the transmitter side and the receiver side and in addition, key information is altered each time when new communication is performed, encryption with very high reliability, which is virtually impossible to decipher is realized. Furthermore, in this case as well, encryption can be processed at a very high speed by performing the encryption by the above described method.

Fifth Embodiment

Figure 3:
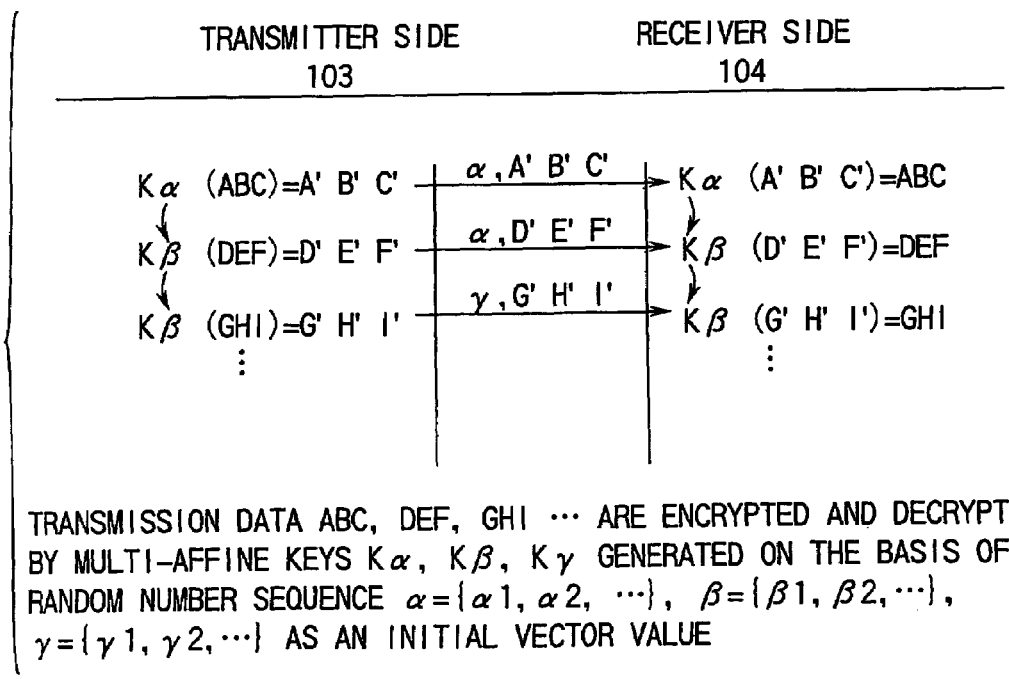
FIG. 3 is an illustration for an encryption communication control procedure of a fifth embodiments of the present invention.

The fifth embodiment is, as shown in FIG. 3, to specify a communication system in which multiple-affine key systems $K_{60}, \ldots$ and the like generated by transforming a multiple-affine key system K in advance stored with a random number sequence $\alpha, \ldots$ and the like as an initial vector V transferred in each communication are used for encryption/decryption.

[Second Communication Control Procedure]

The second communication control procedure in a communication system having such a function is shown in FIG. 3. The second communication control procedure shown in FIG. 3 is an example in which a multiple-affine key system is transformed by random numbers and a method in which multiple-affine key systems K that are a base are fixedly held on both transmitter and receiver sides (for example, held in ROM 12) and the multiple-affine key systems are respectively transformed by random numbers $\alpha$, $\beta$ and $\gamma$ in each communication. For example, the method is suited to encryption of communication directed to many unspecified parties such as encryption of communication contents of a mobile phone.

The method holds multiple-affine key systems K fixedly on both of a transmitter side and a receiver side as a precondition. Values obtained by encrypting random number sequences $\alpha$, $\beta$ and $\gamma$ with the multiple-affine key systems K are used as multiple-affine key systems $K_\alpha$, $K_\beta$ and $K_\gamma$ used in data encryption. Hence, the transmitter side transmits a random number sequence $\alpha$ used in encryption together with a cipher text (A' B' C') of a communication text (ABC). Therefore, on the receiver side, a random number sequence obtained by encrypting the random number sequence $\alpha$ using the multiple-affine key system K is used as a new multiple-affine key system $K_\alpha$ to decrypt the cipher text (A' B' C').

On the transmitter side, since generated random numbers in the random number generation circuit 17 are changed in each communication, the form of a key information is changed by the random numbers, a cipher text that is robust against a known plain text attack can be obtained. In addition, a high-speed encryption can be realized. In the mean time, as in the above embodiments, in cases where random number sequences $\alpha$, $\beta$ and $\gamma$ are constructed of integers each with 16 or more bits, the lower 8 bits may be used for encryption.

Sixth Embodiment

The sixth embodiment specifies a communication system in which multiple-affine key systems K are exchanged between both sides in each communication by transmission of a secret key H and random number sequences $\alpha$ and $\beta$ between the transmitter side and the receiver side as shown in FIG. 4.

[Third Communication Control Procedure]

The third communication control procedure in a communication system having such a function is shown in FIG. 4. The third communication control procedure shown in FIG. 4 is a method in which multiple-affine key systems K are respectively shared by both sides each time when new communication gets started and encryption is performed using a shared multiple-affine key system on each side. Though the method requires a time period for exchange of keys, a high encryption effect can be attained by using in encryption of information browser such as WWW.

In the third communication control procedure, a procedure for sharing a multiple-affine key system is performed at first each time when new communication gets started using the Diffel-Helman key exchange.

Specifically, when an operation is defined regarding a secret key H as a start of a multiple length integer or a finite extension field Z/p and random number sequences are $\alpha$ and $\beta$, at first the transmitter side generates a secret key $H^\alpha$ and sends secret keys H and $H^\alpha$ to the receiver side as shown in FIG. 4. On the receiver side, a multiple-affine key system $K=(H^\alpha)^\beta$ is generated from secret keys H and $H^\alpha$ that have been received on the receiver side.

Then, the receiver side sends a secret key $H^\beta$ with which a multiple-affine key system K is generated for the encryption back to the transmitter side. On the transmitter side, a multiple-affine key system $K=(H^\alpha)^\beta$ is generated for the encryption on the basis on a secret key $H^\beta$ that the transmitter side has received.

Thereafter, transmission data ABC, DEF, GHI, . . . are transmitted after being encrypted with the multiple-affine key system K and the transmission data are decrypted with the multiple-affine key system K on the receiver side.

In the third communication control procedure described above, while a time period of 1 to 2 sec is required for key exchange, encryption with low possibility in deciphering and high security is provided since key information is altered each time when a new communication is gets started. Incidentally, this method is suited to communication with low frequency.

In the mean time, while the embodiment in which a multiple-affine key system is transmitted in each communication is described, there is no specific limitation to this case and, it is acceptable that, for example, control is effected so that multiple key exchange is conducted only in the first communication for the day or so that multiple-affine key system exchange is conducted at constant intervals.

Besides, a further alternative method is not a key exchange in which affine keys are not exchanged randomly, but a key exchange in a recycling mode in which affine keys of predetermined kinds are sequentially substituted so as to go back to the start key at a prescribed cycle. That is, even if keys are changed in a recycling mode in which the same key is repeatedly used at constant cycle intervals, deciphering is practically impossible, so that high security can be retained.

Besides, with the method, even if a discrepancy arises between states of affine keys on respective sides of a transmitter and a receiver, matching between affine keys on the respective sides can be easily achieved. For example, specific numbers are attached to respective keys in advance and then the specific numbers can mutually be notified to match the affine keys each other.

Seventh Embodiment

The seventh embodiment is shown in FIG. 5 and specifies application of an encryption/decryption method of the present invention described above, for example, to a authentication method used for individual authentication such as a credit card that utilizes a communication line.

[Authentication Method Using Encryption Method of Seventh Embodiment]

Description will below be made of an authentication method for a specific other party in which such an encryption method and a communication control procedure for a cipher text are employed. There is substantially no deciphering method for a cipher text using the above described multiple-affine key system. Accordingly, an authentication method in which a third party cannot decipher the contents of authentication can be prepared by conducting authentication of a specific other party utilizing the cipher text.

That is, a keyword or the like for authentication is given to an authentication object (authenticated party 108) as a multiple-affine key system K used for the encryption, and information encrypted using the multiple-affine key system K is sent back to an authenticator party 107 and the sent-back information is decrypted. Thereby, an authentication method with very high reliability and high security can be provided since the third party cannot decipher a key for encryption and a keyword for the authentication can not be deciphered even if communication contents are known for a third party.

As a first authentication method, for example, a predetermined initial vector V is given to the authenticated party 108 (for example, a member of a credit card) as in FIG. 5 and the authenticator party 107 transmits a random number sequence $H_v$ generated using the predetermined initial vector V and communication information M to the authenticated party 108 on authentication. The authenticated party 108 generates a multiple-affine key system K for encryption by using the received random number sequence $H_v$ and the predetermined initial vector that has been given to the authenticated party 108 and sends a cipher text M' that the authenticated party 108 generates by encrypting a communication text M using the generated multiple-affine key system K back to the authenticator party 107. On the other hand, the authenticator party 107 generates a multiple-affine key system K for encryption using the random number sequence $H_V$ and the initial vector V and decrypts the cipher text M' received from the authenticated party 108 using the generated multiple-affine key system K. If the cipher text M' is correctly decrypted, the authenticated party 108 is authenticated as a genuine authenticated party.

As a second authentication method, the authenticator party 107 at first sends an initial vector V and a prescribed communication text M to the authenticated party 108. The authenticated party 108 generates a new random sequence $\{r_i\}$ using a multiple-affine key system K given to the party 108 on the basis of the initial vector V, encrypts a communication text M using the generated random number sequence $\{r_i\}$ and sends the result back to the authenticator party 107. The authenticator party 107 generates a new random number sequence $\{r_i\}$ using a multiple-affine key system K similar to that of the authenticated party 108 on the basis of the initial vector V and decrypts the received cipher text M' using the generated random number sequence. If the cipher text M' is correctly decrypted, the authenticated party 108 is authenticated as a genuine authenticated party.

Description will be made of a concrete example below. As objects of authentication, the following cases are named. Incidentally, objects of application are not limited to those exemplified below, but cases of any authentication to specify an individual person or particular electronic devices are naturally included in the objects. The objects of application are:

(1) application of a multiple-affine key system for the above described encryption to authentication information on electronic transaction in which communication means such as internet is utilized;

(2) application of a multiple-affine key system for the above described encryption to a keyword as a permit to receive pay television broadcasting;

(3) application of a multiple-affine key system to authentication information to identify a particular electronic device, wherein electronic devices are respectively attached with a unique multiple-affine key system. For example, there can be named application of a multiple-affine key system for the above described encryption to authentication of communication permission for a radio device such as a portable phone in order to improve security of communication permission on the radio device; and (4) application of a multiple-affine key system to authentication information on an individual person, wherein individual persons are respectively attached with a unique multiple-affine key system.

Description will be detailed of communication control procedure for authentication with reference to FIG. 5. FIG. 5 is an illustration for an example of authentication procedure utilizing the above described encryption method. Fundamental communication control procedure is similar to the third communication control procedure.

The authentication object (authenticated party) 108 is given with an initial vector V as a unique authentication information as a precondition of authentication. The initial vector V may be registered in, for example, an individual identification card or an electronic device as authentication object. Alternatively, a finger print of an individual person is read in advance and a result obtained from the finger print data may be subjected to Fourier transformation to be used as an initial vector V. In this case, there is no necessity to store authentication information within an electronic device, which improves security.

It is assumed that common multiple-affine key systems are at hands of the authenticated party 108 which is an authentication object, and the authenticator party 107 in advance. The authenticator party 107 retrieves the initial vector V that has been given to the authenticated party 108 before start of execution of authentication procedure on the authenticated party 108 shown in FIG. 5. Further, the authenticator party 107 on the transmission side defines an operation regarding the initial vector V as a start of a multiple length integer or a finite extension field of Z/p and at first generates $H_V$ and sends (V, M) to the authenticated party 108 (authentication object) on the reception side, while the authenticator party 107 generates $H_V$, wherein M in FIG. 5 indicates a communication text.

The authenticated party 108 who has received (V, M) generates a multiple-affine key system K from V in the (V, M).

Thus generated multiple-affine key system K is used for encryption of the communication text. Then, a cipher text M' prepared by encrypting the communication text M using the generated multiple-affine key system K is sent back to the authenticator party 107.

On the authenticator party 107 side, a multiple-affine key system K is generated using the initial vector V as on the authenticated party 108 side. Further, the cipher text M' that has been received from the authenticated party 108 is decrypted using the generated multiple-affine key system K. At this point, if K(M)=M', it is judged that the authenticated party is genuine, but if not, it is judged that the authenticated party is false.

In the mean time, in a case where identification of the authenticated party is difficult prior to the communication control procedure for authentication, it is acceptable as communication control procedure preceding the authentication to take a procedure in which information to identify the authenticated party, for example, ID number information of the authenticated party is inquired to obtain the ID number information and then, a multiple-affine key system of the authenticated party is retrieved on the basis of the ID number information.

Even in such a control, since there is adopted an encryption method for authentication in which only an ID number information is transmitted and there is no chance for a multiple-affine key system to be transmitted and therefore, a multiple-affine key system is not deciphered, authentication with very high security can be achieved.

Further, as another authentication method, the authenticator party 107 at first sends an initial vector V and a prescribed communication text M to the authenticated party 108. The authenticated party 108 may generate a new random number sequence $\{r_i\}$ on the basis of the initial vector V and sends a cipher text M' generated by encrypting a communication text M that has been received using the generated random number sequence back to the authenticator party 107.

Then, the authenticator party 107 generates a new random number sequence $\{r_i\}$ using the initial vector V and decrypts the cipher text M' that has been received from the authenticated party 108 using the generated random number sequence. If decryption is correctly effected, it is judged that the authentication object is an authentic party.

When a cipher text obtained by any of the encryption methods described above is decrypted in a procedure similar to the above procedure, and then authentication is performed on the basis of whether or not decryption is correctly effected, authentication with high security can be achieved.

Eighth Embodiment

Figure 10:
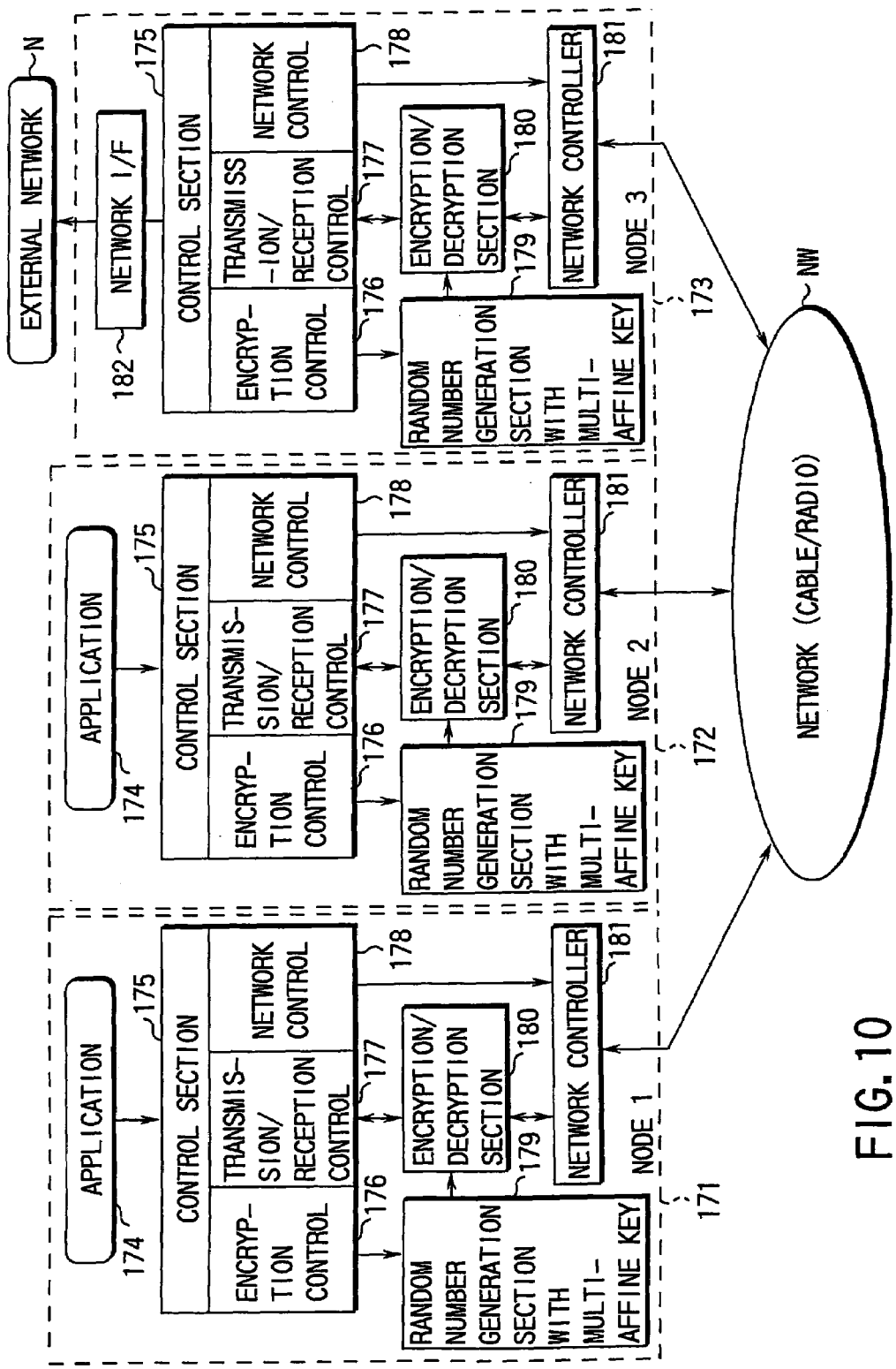
FIG. 10 is a block diagram showing a structure of a communication apparatus for network communication accompanying encryption/decryption using a multiple-affine key system according to an eighth embodiment of the present invention.

The eighth embodiment is shown in FIG. 10 and specifies a router device employed in a network system to which an encryption/decryption method of the present invention is applied.

In FIG. 10, there are shown a plurality of communication apparatuses 171 and 172 connected to a network in which an encryption/decryption method with the above described multiple-affine key system is employed and a router device 173. In the communication apparatuses 171 and 172, a control section 175 connected to an application 174 that performs prescribed processing and an encryption control section 176, a transmission/reception section 177 and a network control section 178, the three of which functionally constitute the control section 175 are respectively connected to a random number generation section 179 using a multiple-affine key system, an encryption/decryption section 180, and a network controller 181. Further, the network controller 181 is connected to a network NW such as LAN provided in a prescribed area in an office of a company and the like.

The communication apparatuses 171 and 172 having such a configuration performs encryption/decryption of information on the basis of a random number sequence using a multiple-affine key system of the present invention in various patterns as described above and enable transmission/reception of data while keeping high security through the network NW.

Besides, in the router device 173, a first network controller 181 connected to a first network NM, a second network interface 182 connected to an external network N different from the first network NW, a control section 175 for controlling operations of constituents and an encryption control section 176, a transmission/reception control section 177 and a network control section 178 all of which three sections are functionally parts of the control section 175 are respectively connected to a random number generation section 179 using a multiplying affine key, an encryption/decryption section 180 and a network controller 181.

In such a configuration, the router device 173 is to connect different LANs therebetween and to control connection of communication apparatuses and routes between a plurality of networks on the basis of control of the control section 175. In this case, in the router device, the following function can be obtained in addition to the original function: only given information is encrypted on the basis of a random number sequence $\{r_i\}$ generated by the random number generation section 179 using a multiple-affine key system of the present invention according to a setting condition as described above under control of the encryption control section 176 of the control section and thereby, the cipher thus prepared can be transferred to the other communication apparatuses 171 and 172 or the external network N. Still further, transmission/reception information to/from the external network N, for example, is never failed to be subjected to encryption/decryption using a multiple-affine key system of the present invention and thereby, information within a network NW can be kept secret to the outside. A way of encryption/decryption in this case is not limited to methods shown in the first to third embodiments, but various embodiments using a multiple-affine key system can be employed, which makes it possible to perfectly keep a secret with fast processing.

Ninth Embodiment

The ninth embodiment specifies, as shown in FIGS. 11 to 21, a computer program realized as an application computer program that makes an encryption/decryption method using a multiple-affine key system executable on a computer a medium in which the program can be stored and a computer apparatus on which the computer program is loaded.

Figure 11:
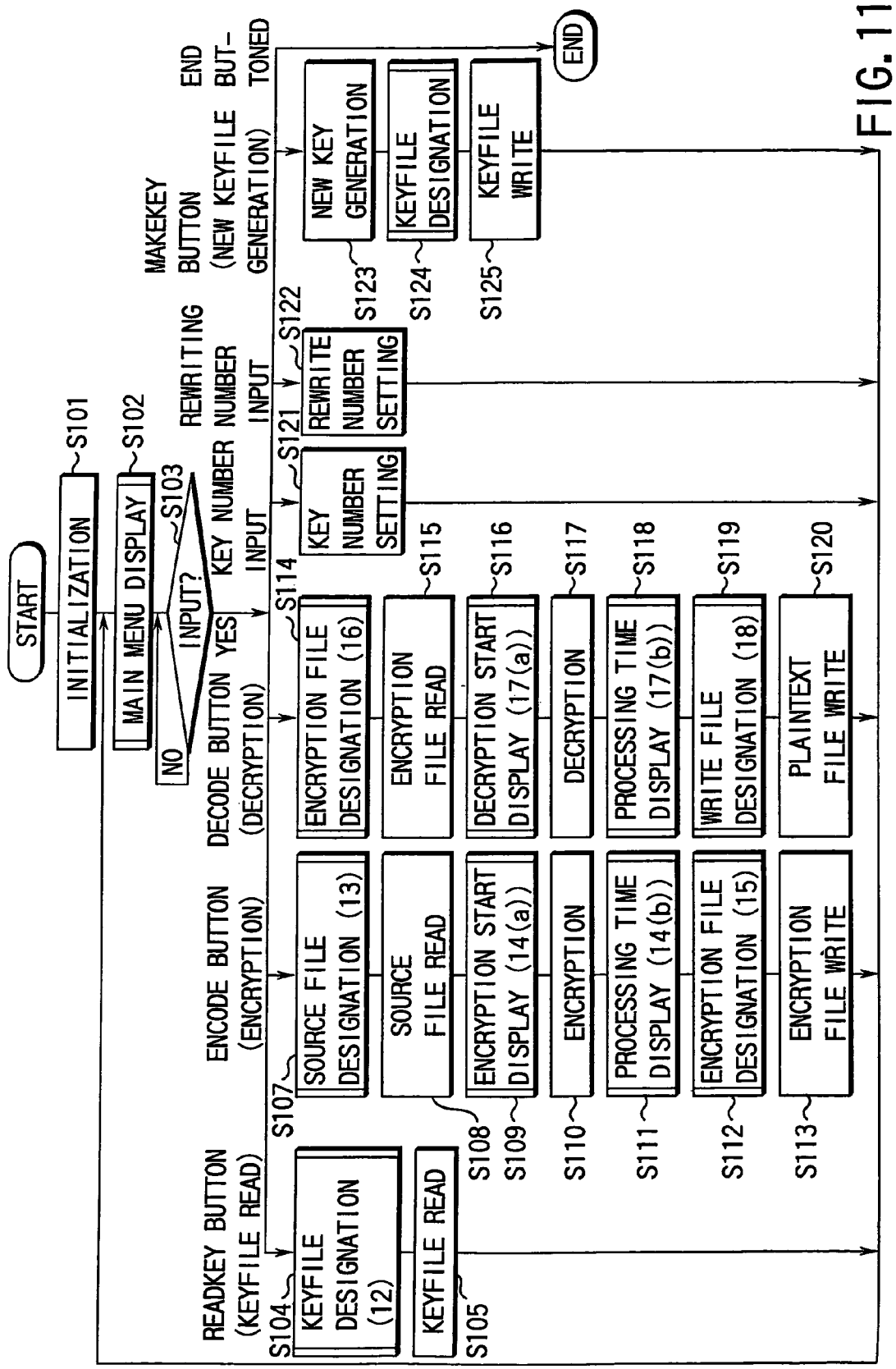
FIG. 11 is a flowchart showing fundamental operations by an application computer program on which encryption/decryption using a multiple-affine key system according to a ninth embodiment of the present invention is executed.
Figure 12:
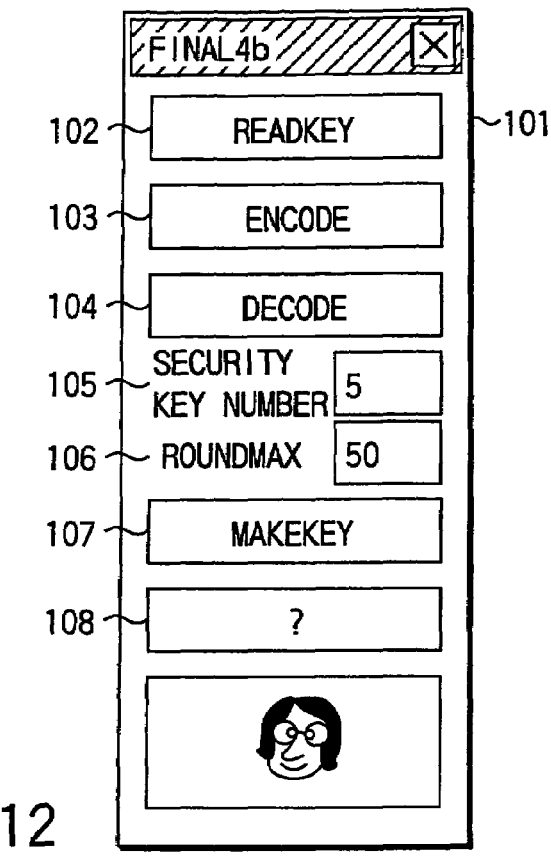
FIG. 12 is a screen showing a main menu of the application program.
Figure 13:
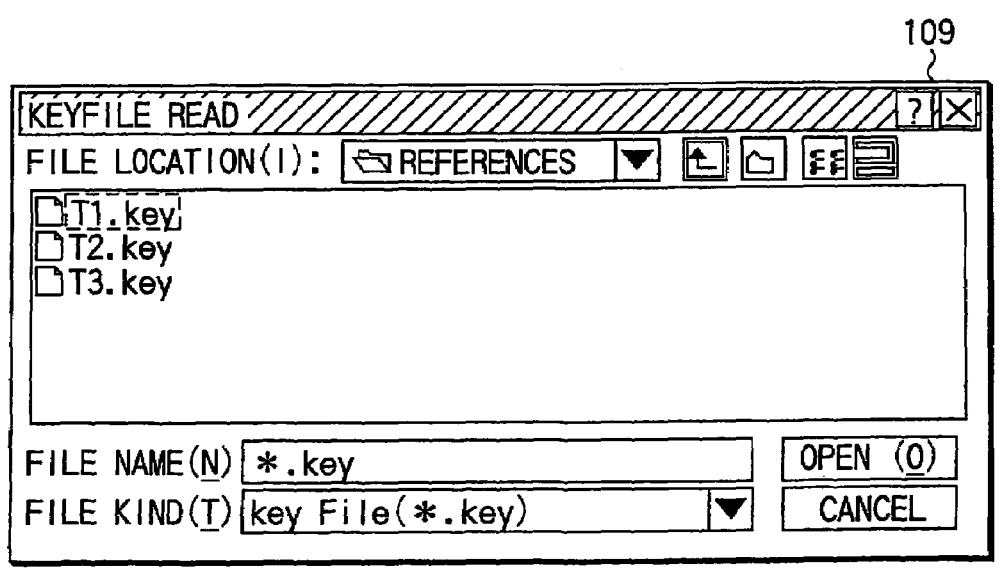
FIG. 13 is a screen for reading of a keyfile of the application program.
Figure 14:
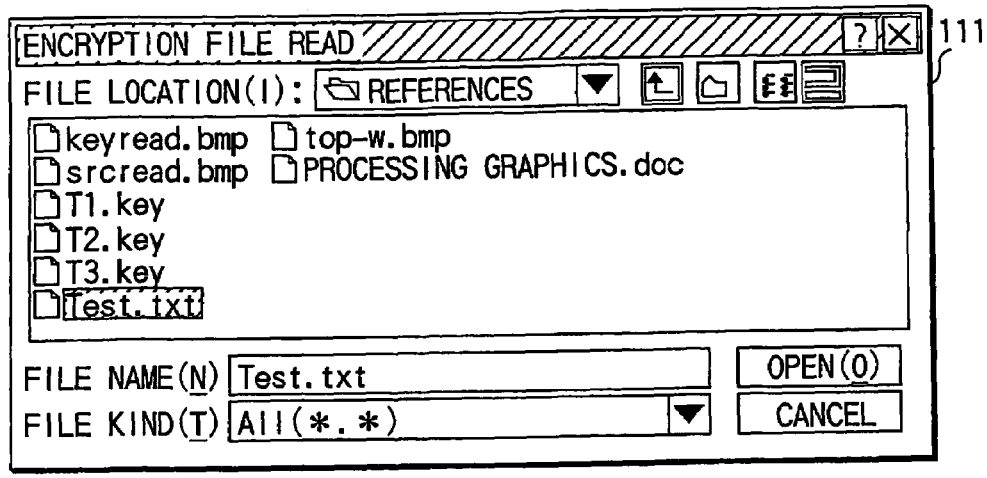
FIG. 14 is a screen for reading of an encrypted file of the application program.
Figure 15A:
FIGS. 15A and 15B are views showing a start screen and an end screen of the application program.
Figure 15B:
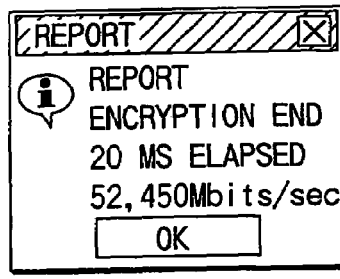
Figure 16:
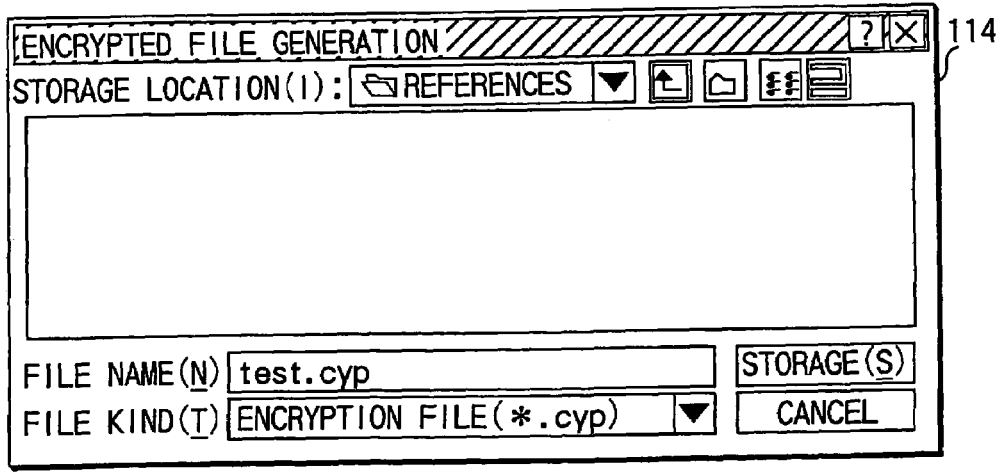
FIG. 16 is a screen for generation of an encrypted file of the application program.
Figure 20:
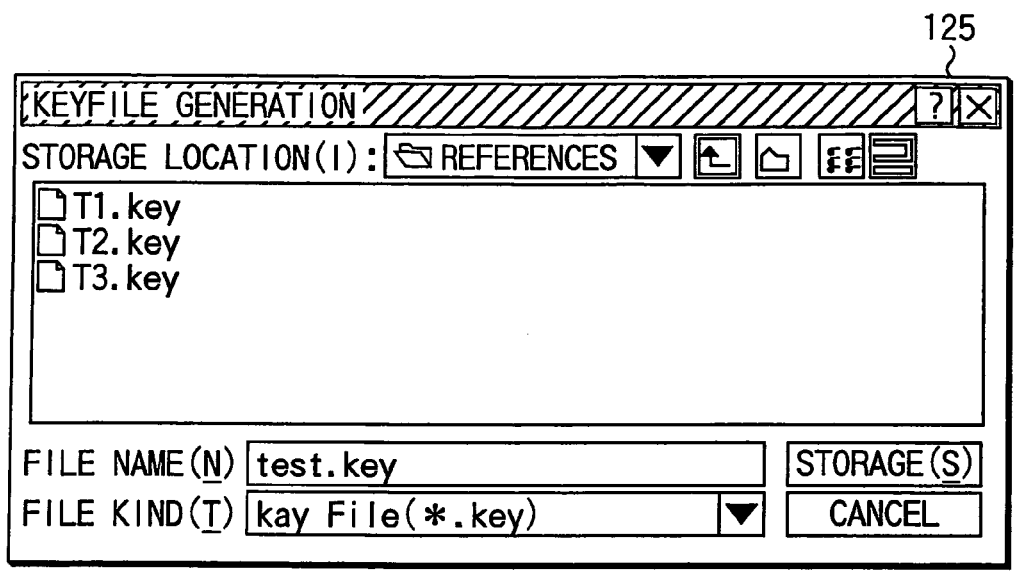
FIG. 20 is a screen for generation of a keyfile of the application program.
Figure 21:
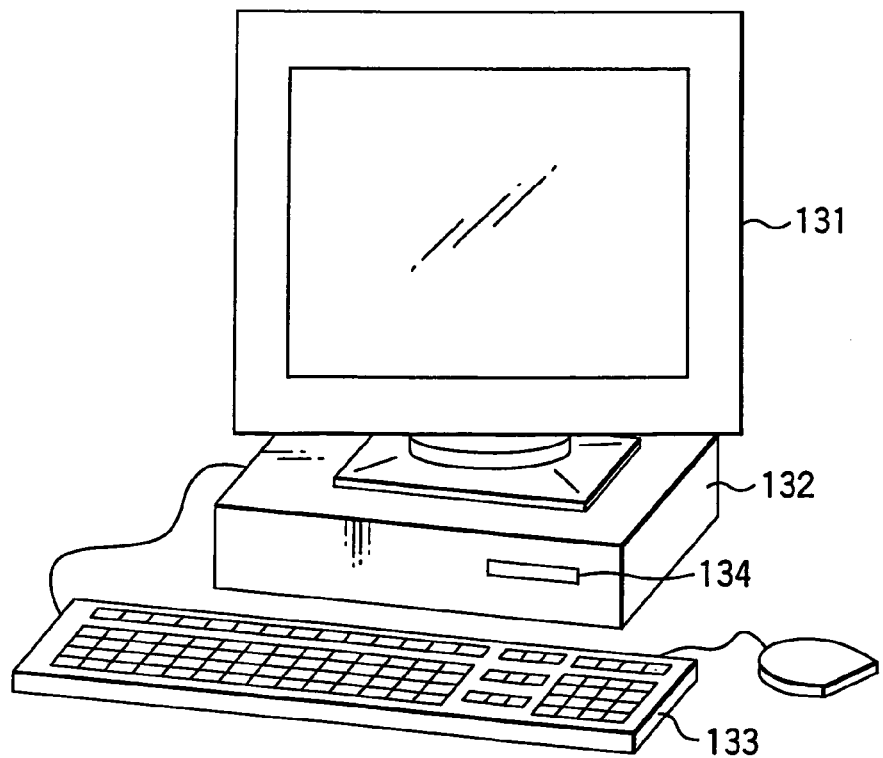
FIG. 21 is a view showing an appearance of a computer system in which an application computer program is executed which performs encryption/decryption using a multiple-affine key system according to the ninth embodiment of the present invention.

FIG. 11 is a flowchart showing fundamental operations of the application program, FIG. 12 is a screen showing a main menu of the program, FIG. 13 is a screen for reading a keyfile, FIG. 14 is a screen for reading an encrypted file, FIGS. 15A and 15B are start and end screens of encryption, FIG. 16 is a screen for generating an encrypted file, FIG. 17 is a screen for selecting an encrypted file as an object for decryption, FIGS. 18A and 18B are start and end screens of decryption, FIG. 19 is a screen for generating a. decrypted file, FIG. 20 is a screen for generating a keyfile and FIG. 21 is an appearance of a computer system on which the program is executed.

An encryption/decryption method using a multiple-affine key system of the present invention efficiently is realized, for example, as an application computer program on a personal computer. The reason why is that the computer is provided with necessary functions including various kinds of setting for encryption/decryption, reading and storing encrypted and decrypted files and the program can be easily operated like compression/decompression of a file.

Below, fundamental operations will sequentially be described mainly on the basis of the flowchart with reference to operating screens.

The program that has been initialized (S101) is presented as a main menu as shown in FIG. 12, for example, on a screen 131 of the computer systems 132, 133 and 134 shown in FIG. 21 (S102). On the menu screen, there are displayed a readkey 102 for reading a keyfile, an encode key 103 for encryption, a decode key 104 for decryption, number of security key 105 for setting the number of keys, number of key rewriting times 106, a makekey 107 for generating a new keyfile and a question key 108 for inquiring about operations. If an input is conducted (S103), processing progresses according to program flow shown in the flowchart.

Now, description will be given of operations of the program according to a procedure of encryption/decryption of one document file based on the program. First, the number 105 of multiple-affine key systems for encryption/decryption is input (S121) and the limiting number 106 of use times for automatic rewriting of a multiple-affine key system of the present invention is input (S122). Then, a keyfile for random number generation for encryption/decryption is designated, a place where key information is stored is designated on a screen 109 as shown in FIG. 13 (S104) and thereby, a keyfile thus designated is read (S105). Then, a file to be encrypted is read designating the file on screen 111 shown in FIG. 14 (S107). When reading is completed, a screen that awaits a start instruction for encryption of FIG. 15A appears and if OK is clicked, encryption is performed (S110). Then, a screen on which encryption is finished is displayed together with a processing time as in FIG. 15B appears (S111). Detailed contents of the encryption are nothing but processing shown in the first embodiment detailed above.

Then, since a screen 114 that inquires where an encrypted file as shown in FIG. 15B should be stored is displayed, if the place is designated, the encrypted file is written (S113).

Likewise, in the decryption, a file to be decrypted is designated on a screen 121 of FIG. 17 (S114 ) and after an encrypted file is read (S115), an OK button of a display of decryption start of FIG. 18A is clicked to perform decryption (S117) and then a processing time period and end of the processing is displayed on a screen of FIG. 18B (S118). When it is designated where a decrypted file is written on a screen 124 of FIG. 19 (S119), a plain text file that has been decrypted is written in a designated place (S120).

Further, the program can generate a new multiple-affine key system (S123) and a generated new key is written in a storage place if the storage place is designated on a screen 125 of FIG. 20 (S125).

As described above, according to the program, encryption/decryption using a multiple-affine key system with very high confidentiality and a high speed in processing can be realized by easy operations, for example, on the computer system of FIG. 21, for example, as in compression/decompression of a file.

Incidentally, the application program may be stored in, for example, a medium that is readable by a computer system and besides, the application program may be stored in advance in a storage area of ROM and the like in the computer system 132 of FIG. 21. Of course, the program may be on a network as far as a equivalent function and effect can be guaranteed.

Tenth Embodiment

Figure 22:
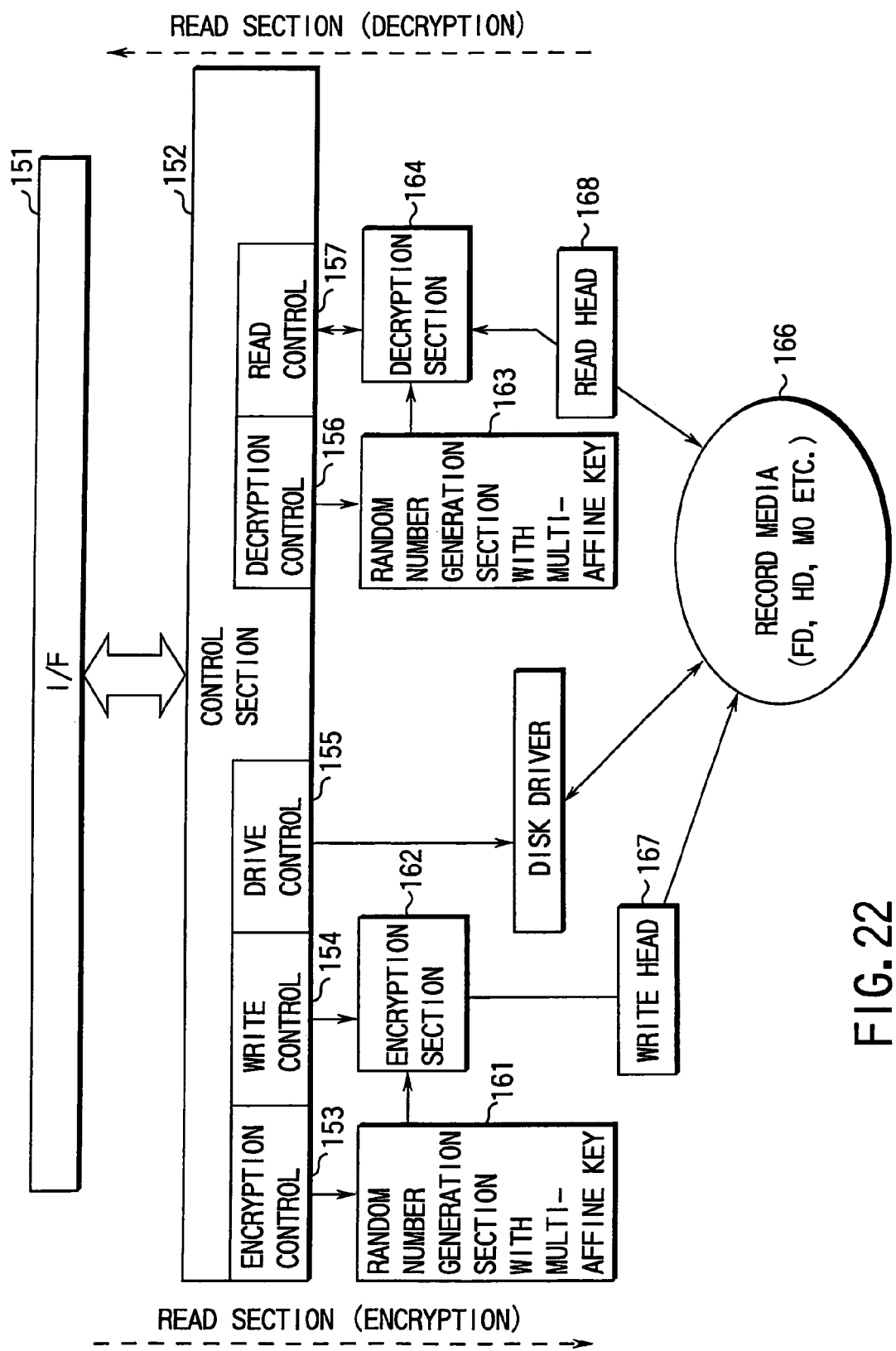
FIG. 22 is a block diagram showing a configuration of a disk device such as a floppy disk accompanying encryption/decryption using a multiple-affine key system according to a tenth embodiment of the present invention.

The tenth embodiment specifies, as shown in FIG. 22, a recording/reproduction device for a record medium accompanying encryption/decryption using a multiple-affine key system.

A recording/reproduction device for the record medium is, for example, a device used for a demountable or non-demountable record medium such as a floppy disk, hard disk or MO, and the fundamental configuration is shown in FIG. 22. That is, the recording/reproduction device comprises an interface section 151 to the outside and a control section 152 for controlling the entire operations of constituents connected thereto, wherein the control section 152 includes an encryption control section 153, a write control section 154, a drive control section 155, a decryption control section 156 and a read control section 157, and further comprises a random number generation section 161 using a multiple-affine key system, an encryption section 162, a disk driver 165, a random number generation section 163 using a multiple-affine key system and a decryption section 164 connected to the constituents of the control section 152 and still further comprises a write head 167 connected to the encryption section 162 and a read head 168 connected to the decryption section 164.

With such a configuration, in the medium recording/reproduction device, the record medium 166 is driven at a prescribed rotation number by the disk driver 165 in recording. Prescribed information provided through the interface 151 under control of the control section 152 is encrypted according to a random number sequence generated by the random number generation section 161 using a multiple-affine key system in the encryption section 162 and writing of such encrypted information is performed by the write head 167.

Further, in reading, the above described encrypted information is read from the record medium 166 rotated by the disk driver 165 through the read head 168, the encrypted information is decrypted in the decryption section 164 according to a random number sequence generated by the random number generation section 163 using a multiple-affine key system and output to the outside through the interface section 151.

In embodiments of encryption/decryption in read/write operations, not only the first to third embodiments but various modifications of the embodiments can naturally be allowed. That is, a multiple-affine key system may be one stored in advance or a multiple-affine key system may be one specified by a secret key H given from the interface section 151.

Further, the encryption/decryption may automatically be performed in read/write operations all time and may selectively be conducted on the basis of setting by a user. According to the present invention, in any case of application, there can be provided a medium recording/reproduction device with very high confidentiality, which is very difficult to be deciphered, by using a multiple-affine key system automatically rewritten.

Eleventh Embodiment

The eleventh embodiment is shown in FIG. 23 and specifies an optical disk recording/reproduction device accompanying encryption/decryption using a multiple-affine key system of the present invention.

The embodiment is to apply an encryption/decryption method of the present invention to an optical disk recording/reproduction device in which data (information) is recorded on an optical disk (for example, DVD-RAM) 340 as a record medium using collected light or data recorded in the optical disk 340 is reproduced.

In FIG. 23, the optical disk recording/reproduction device comprises a CPU 390 for controlling the entire operations, a memory 397 connected to CPU through a data bus and a D/A converter 391, further comprises, as a recording system for information, a multiple affine encryption section 394, a random number generation section 393 using a multiple-affine key system connected to the multiple affine encryption section 394, a data generation circuit 374 and a laser control circuit 373 and still further comprises an optical header section 365. Besides, the optical disk recording/reproduction device comprises, as a reproduction system for information, a data reproduction circuit 378, an error correction circuit 392, a random number generation circuit 395 and a decryption section 396. Furthermore, the optical disk recording/reproduction device comprises, as a drive system, a linear motor 366 for moving the optical header, a drive coil 367; and a linear motor control circuit 368 for controlling the linear motor 366 and further a motor control circuit 364 for controlling a motor to hold and rotate the optical disk 340 disposed in the vicinity of the optical header. In addition, the optical disk recording/reproduction device comprises, as an optical system, a focusing control circuit 387 for controlling focusing of laser light of the optical header 365 on the optical disk 340 and a tracking control circuit 388 for controlling tracking.

In such a configuration, recording of information on the optical disk 340 is conducted as follows. In other words, prescribed information is input for recording on the optical disk 340 rotated at a prescribed rotation number by a motor driven by the motor control circuit 364 under control of the CPU 390 and the information is then supplied to the encryption section 394, wherein the information is encrypted with a random number sequence based on a multiple-affine key system rewritten each time when the key is used a predetermined number of times. Further, the encrypted information is transmitted to the data generation circuit 374 and the information is replaced with laser light information for recording. Recording is performed using the optical header 365 on a specific recording area of the optical disk.

Of course, encryption in the multiple affine encryption section 394 in this case can be conducted by the processing accompanying features of the embodiments of the present invention described above. For example, it is acceptable not only the case that a multiple-affine key system is always prepared in advance prior to the processing but the case that the key may be generated each time when the key is to be replaced using an external encryption key H.

Further, reproduction of information recorded in the optical disk 340 is performed in the following way, That is, encrypted information read through the optical header 365 from a specific area of the optical disk 340 on the basis of the read operations of the rotary system and the optical system is replaced with a reproduced signal through the data reproduction circuit 378, wherein the encrypted information is decrypted on the basis of a random number sequence generated from the random number generation circuit 395 using a multiple-affine key system rewritten each time when the number of use times of the multiple-affine key system reaches a predetermined number thereof, and output as a reproduction signal.

Details of the encryption/decryption in this case can be explained with the respective embodiments described above. That is, as an example, a multiple-affine key system used for generating random numbers may be stored in the memory 393 and the like in advance or it may newly be set each time of write from a secret key H and the like provided from the outside as in the second embodiment.

As described above, in an optical disk recording/reproduction device as well, when encryption/decryption using a multiple-affine key system having a self-rewrite function of the present invention is applied, an optical disk recording/reproduction device with high confidentiality, which is hard to be read by a third party, can be provided.

Twelfth Embodiments

The twelfth embodiment is shown in FIG. 24 and specifies a radio transmission/reception device such as a portable phone accompanying encryption/decryption using a multiple-affine key system of the present invention.

A fundamental configuration of the radio transmission/reception device is shown in FIG. 24 and comprises an antenna 201, a duplexer 202, an RF reception gain variable amplifier 203, an RF band limit filter 204, a frequency converter 205, an IF band limit filter 206, an IF reception gain variable amplifier 207, a modulation/demodulation section 208, an IF transmission gain variable amplifier 211, a frequency converter 212, an RF band limit filter 213, an RF transmission gain variable amplifier 214, a power amplifier 215, an isolator 216, a vocoder 287 and a speaker 288.

Description will be made of reception in the transmitter/receiver with such a configuration. A forward link signal transmitted from a base station is received by the antenna 201, filtered by a duplexer 202 fro signal components within a reception signal band, amplified or attenuated in the RF reception gain variable amplifier 203, again filtered by the RF band limit filter 204 for unnecessary signal components, frequency-converted from the RF band to the IF band in the frequency converter 205, still again filtered by the IF band limit filter 206 for unnecessary signal components, again amplified or attenuated in the IF reception gain variable amplifier 207 and input to the modulation/demodulation section 208.

The modulation/demodulation section 208, for example, comprises an orthogonal demodulation section 281, an A/D converter 282, an information signal demodulation section 283, an information signal modulation section 284, a D/A converter 285 and an orthogonal modulation section 286. In the configuration, a signal orthogonally demodulated in the orthogonal demodulation section 281 is converted in the A/D converter 282, not only demodulated into an information signal in the signal demodulation section 283 but also output signal from the section 283. The output signal is output from the decryption section 292 as a decrypted signal after the decryption on the basis of a random number sequence generated using a multiple-affine key system by the random number generation circuit 291.

Therefore, there can be realized decryption of encrypted information with very high confidentiality using a multiple-affine key system rewritten each time when the number of use times of a multiple-affine key system reaches a predetermined number thereof. Besides, the decryption in this case can be performed in a form according to any of the above detailed embodiments. As an example, the case of the second embodiment is named, wherein a secret key H and an initial vector V are received together with a cipher text, affine keys corresponding to those are generated when a need arises, random number sequences are also generated using the affine keys and eventually decryption is performed by the random number sequences. Thereby, decryption with a new affine key can be effected for each communication.

Description will be made of transmission of the radio transmitter/receiver below. A reverse link signal transmitted from a mobile station is given to the vocoder 287 and encrypted in the encryption section 289 by a random number sequence given from the random number generation section 290 generated using a multiple-affine key system. An encrypted signal is modulated by the information signal modulation section 284 and output therefrom. The output signal is converted in the D/A converter 285, orthogonally modulated in the orthogonal modulation section 286, amplified or attenuated in the IF transmission gain variable amplifier 211, subjected to frequency conversion from the IF band to the RF band in the frequency converter 212, filtered in the RF band limit filter 213 for unnecessary signal components, again amplified or attenuated in the RF transmission gain variable amplifier 214, still again amplified in the power amplifier 215, again filtered in the duplexer 202 for only signal components within transmission signal band and eventually transmitted to the air from the antenna 201.

In such a manner, a radio signal encrypted using a multiple-affine key system rewritten in each time when the number of use times of the multiple-affine key system reaches a predetermined number has high confidentiality since deciphering by a third party is impossible. Further, needless to say that an embodiment of encryption can be those in the above detailed embodiments. For example, a multiple-affine key system may be stored in a memory or the like in advance, alternatively may be a new one generated on the basis of a secret key H and an initial vector V from the demodulation section 283 which is supplied from the other communication party in on-going communication, as specified in the second embodiment. In this case, communication accompanying encryption/decryption using an affine key unique to the communication parties can be performed and therefore, communication with extremely high confidentiality can be realized.

In a radio transmission/reception device such as a portable phone as well, as detailed above, an encryption section and a decryption section using a multiple-affine key system of the present invention are adopted, thereby speech communication with high speed and very high confidentiality can be realized.

According to the present invention, as described above, there is provided an encryption method and an encryption system with variety of applications, which not only enables high-speed encryption but makes deciphering by a third party impossible.

Further, since stream encryption is employed using random numbers and a multiple-affine key system, a high security, high-speed encryption method is established while refusing a known plain text attack.

In cipher text communication, since a multiple-affine key system for encryption are shared between communication parties, a cipher text can be transmitted without transmission of key information for encryption and encryption communication with high security, which is very hard to be deciphered, can be realized.

Further, as in the fifth embodiment (FIG. 3), since an affine key is changed in each communication and a communication text is encrypted/decrypted with a changed affine key, encryption communication with high security, which is hard to be deciphered, can be realized.

Further, as in the sixth embodiment (FIG. 4), since control is effected so that key information for encryption is shared by both parties before communication and affine keys are changed each communication, encryption communication with high security, which is hard to be deciphered, can be performed.

Further, as in the seventh embodiment (FIG. 5), since a communication text sent from an authenticator party is encrypted using a multiple-affine key system given to an authenticated party in advance and a cipher text is sent back to the authenticator party, and decrypted on the authenticator party according to a similar procedure, high security authentication can be achieved by judging that the authenticated party is genuine if a decryption can be correctly performed.

Further, as in the ninth embodiment (FIGS. 11 to 21), since encryption/decryption of a multiple-affine key system is conducted on a computer program, a high security, high-speed encryption/decryption can be realized with a very easy operation.

Further, as in the tenth and eleventh embodiments (FIGS. 22 and 23), since an encryption/decryption circuit for a multiple-affine key system is provided within a recording/reproduction device for a medium, very high security recording/reproduction of information can be easily realized.

Further, as in the twelfth embodiment (FIG. 24), when an encryption/decryption circuit for a multiple-affine key system is provided in a radio transmitter/receiver such as a portable phone, high confidentiality speech communication and the like can easily be realized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A random number generating apparatus comprising:
    affine key generating and holding means for generating and holding a plurality of items of affine key data expressed by four integers as $K=\{a, b, c, n,\}$, an action of the affine key on an integer x of a finite field F is defined as $K(x)=ax+b$ where for a plurality of coefficients a and b, c represents a number of use times and n represents a predetermined limit on the use times;
    random number generating means for selecting an item of a first affine key data from the plurality of items of the affine key data held in the affine key generating and holding means, in accordance with previously generated random number data, and generating random number data in accordance with the selected item of the first affine key data; and
    control means for counting the number of use times (c) for the generation of the random number data of the first affine key data generated by the random number generating means and, if it is determined that the number of use times (c) is equal to or greater than the predetermined limit on the use times (n) of the first affine key data, setting the number of use times (c) of the first affine key data to 0 and updating the coefficients a, b of the first affine key data held by the affine key generating and holding means, in accordance with a second affine key data held by the affine key generating and holding means.

2. The apparatus according to claim 1, wherein if the coefficient a or the coefficient b is 0 after updating the first affine key data, the control means replaces the updated coefficient of the first affine key data with a non-zero value.

3. An encrypting apparatus comprising:
    affine key generating and holding means for generating and holding a plurality of items of affine key data, the affine key K expressed by four integers $K=\{a, b, c, n\}$, an action of the affine key on an integer x of a finite field F is defined as $K(x)=ax+b$ where for a plurality of coefficients a and b, c represents a number of use times and n represents a predetermined limit on the user times;
    random number generating means for selecting an item of a first affine key data from the plurality of items of the affine key data held in the affine key generating and holding means, in accordance with previously generated random number data, and generating random number data in accordance with the selected item of the first affine key data;
    control means for counting the number of use times for the generation of the random number data of the first affine key data generated by the random number generating means and, if it is determined that the number of use times (c) is equal to or greater than the predetermined limit on the use times (n) of the first affine key data, setting the number of use times (c) of the first affine key data to 0 and updating the coefficients a, b of the first affine key data held by the affine key generating and holding means, in accordance with a second affine key data held by the affine key generating and holding means;
    a memory which holds a plain text; and
    encrypting means for operating random number sequence data based on the random number data generated by the random number generating means and the plain text held by the memory, by an exclusive OR, generating a cipher text and recording the cipher text in a recording medium.

4. The apparatus according to claim 3, wherein if the coefficient a or the coefficient b is 0 after updating the first affine key data, the control means replaces the updated coefficient of the first affine key data with a non-zero value.

5. A random number generating apparatus comprising:
    affine key unit configured to generate and hold a plurality of items of affine key data, the affine key K expressed by four integers $K=\{a, b, c, n,\}$, an action of the affine key on an integer x of a finite field F is defined as $K(x)=ax+b$ where for a plurality of coefficients a and b, c represents a number of use times and n represents a predetermined limit on the use times;
    random number generator configured to select an item of a first affine key data from the plurality of items of the affine key data held in the affine key unit, in accordance with previously generated random number data, and generating random number data in accordance with the selected item of the first affine key data; and
    controller configured to count the number of use times (c) for the generation of the random number data of the first affine key data generated by the random number generator and, if it is determined that the number of use times (c) is equal to or greater than the predetermined limit on the use times (n) of the first affine key data, setting the number of use times (c) of the first affine key data to 0 and updating the coefficients a, b of the first affine key data held by the affine key unit, in accordance with a second affine key data held by the affine key unit.

6. The apparatus according to claim 5, wherein if the coefficient a or the coefficient b is 0 after updating the first affine key data, the controller replaces the updated coefficient of the first affine key data with a non-zero value.

* * * * *